(12) United States Patent
Mizuno et al.

(10) Patent No.: US 12,527,470 B2
(45) Date of Patent: Jan. 20, 2026

(54) OPHTHALMOLOGIC APPARATUS AND VISUAL TARGET PRESENTING DEVICE

(71) Applicant: TOPCON CORPORATION, Tokyo (JP)

(72) Inventors: Akira Mizuno, Tokyo (JP); Naoki Inuzuka, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 666 days.

(21) Appl. No.: 17/940,638

(22) Filed: Sep. 8, 2022

(65) Prior Publication Data
US 2023/0105121 A1    Apr. 6, 2023

(30) Foreign Application Priority Data

Sep. 28, 2021    (JP) ................... 2021-158483

(51) Int. Cl.
*A61B 3/032*    (2006.01)
*A61B 3/18*    (2006.01)

(52) U.S. Cl.
CPC ............... *A61B 3/032* (2013.01); *A61B 3/18* (2013.01)

(58) Field of Classification Search
CPC .......... A61B 3/00; A61B 3/09; A61B 3/0008; A61B 3/0025; A61B 3/0075; A61B 3/0058; A61B 3/032; A61B 3/028; A61B 3/04; A61B 3/02; A61B 3/18; A61B 3/12; A61B 3/15; A61B 3/14; A61B 3/145; A61B 3/152; A61B 3/156; A61B 3/103; A61B 3/113; A61B 3/117

USPC ........ 351/211, 221, 232, 237–340, 204–206, 351/243–246
See application file for complete search history.

(56) References Cited

U.S. PATENT DOCUMENTS

2004/0119944 A1 * 6/2004 Hosoi .................... A61B 3/10
351/221
2012/0092621 A1    4/2012 Ozaki

FOREIGN PATENT DOCUMENTS

| JP | 2021-128940 | 5/2001 |
| JP | 2012-85697  | 5/2012 |
| JP | 2018-047095 | 3/2018 |
| JP | 2021-49220  | 4/2021 |
| JP | 2021-137260 | 9/2021 |

OTHER PUBLICATIONS

Extended European Search Report issued Feb. 15, 2023 in corresponding European Patent Application No. 22193606.5.
Japanese Office Action issued Jun. 3, 2025 in corresponding Japanese Patent Application No. 2021-158483, with English machine translation.

* cited by examiner

*Primary Examiner* — Jie Lei

(57) ABSTRACT

An ophthalmologic apparatus includes a first visual target presenting unit that presents a first eye chart including a visual target, at a first examination distance, to an examinee's eye of which a trial lens is disposed ahead, and a second visual target presenting unit that presents a second eye chart including a visual target, at a second examination distance different from the first examination distance, wherein the first eye chart and the second eye chart are presented adjacently in plan view in a presentation region in which no influence of aberration of the trial lens is present, within a range viewable by the examinee's eye through the trial lens.

10 Claims, 11 Drawing Sheets

OPHTHALMOLOGIC APPARATUS AND VISUAL TARGET PRESENTING DEVICE

CROSS-REFERENCE TO RELATED APPLICATION

This application is based upon and claims the benefit of priority from Japanese patent application No. 2021-158483 filed on Sep. 28, 2021, the entire disclosure of which is incorporated herein by reference.

BACKGROUND ART

The present disclosure relates to an ophthalmologic apparatus and a visual target presenting device for use in the ophthalmologic apparatus.

Known has been subjective vision testing in which a visual target is presented to an examinee's eye and the visual function of the examinee's eye is examined on the basis of a response from the examinee about its degree of vision to the visual target. Examples of such subjective vision testing include far-vision examination for examination of the degree of vision to a visual target presented at a far-vision examination distance, such as at 5 m ahead, from an examinee's eye and near-vision examination for examination of a change in the ability of accommodation, for example, due to aging, with a visual target presented, for example, at a near-vision examination distance of 30 to 40 cm from an examinee's eye.

As an exemplary ophthalmologic apparatus that conducts such far-vision examination and near-vision examination, disclosed has been an ophthalmologic apparatus including: a refractor head; a visual target presenting device that presents a far-vision visual target at a far-vision examination distance; and a near-vision visual target board suspended from a near point rod attached to the refractor head (for example, refer to JP 2021-49220 A). With the ophthalmologic apparatus, at the time of far-vision examination, the visual target presenting device presents a visual target to an examinee's eye, and, at the time of near-vision examination, a visual target is presented to the examinee's eye with the visual target board suspended by the near point rod, on the line of sight on which a visual target for far-vision examination is viewed by the examinee's eye, ahead of the visual target presenting device.

SUMMARY

According to the above conventional technology, a visual target for near-vision examination is disposed on the line of sight on which a visual target for far-vision examination is viewed by an examinee's eye. Every time far-vision examination and near-vision examination are alternately conducted, the near point rod requires operating such that the visual target board is disposed ahead of the visual target presenting device or is retreated. Thus, trouble and time are required in the exchange between a far-vision visual target and a near-vision visual target. Therefore, there is room for a further improvement in examination efficiency.

The present disclosure has been made in consideration of the above circumstances, and an object of the present disclosure is to make a further improvement in examination efficiency at the time of far-vision examination and near-vision examination of an examinee's eye.

In order to achieve the above object, an ophthalmologic apparatus includes a first visual target presenting unit that presents a first eye chart including a visual target, at a first examination distance, to an examinee's eye of which a trial lens is disposed ahead, and a second visual target presenting unit that presents a second eye chart including a visual target, at a second examination distance different from the first examination distance, wherein the first eye chart and the second eye chart are presented adjacently in plan view in a presentation region in which no influence of aberration of the trial lens is present, within a range viewable by the examinee's eye through the trial lens.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for the sake of clarity.

An ophthalmologic apparatus and a visual target presenting device for use in the ophthalmologic apparatus according to each of first to eighth embodiments of the present disclosure will be described below with reference to the drawings.

First Embodiment

The configuration of an ophthalmologic apparatus 100 according to a first embodiment will be described below with reference to FIGS. 1 to 3. The ophthalmologic apparatus 100 according to the first embodiment serves as a binocular open-field ophthalmologic apparatus capable of conducting, with an examinee keeping the left and right eyes open, examination of the visual function of an examinee's eye. Note that the ophthalmologic apparatus 100 according to the first embodiment enables, for example, monocular examination with either eye occluded.

Figure 1:
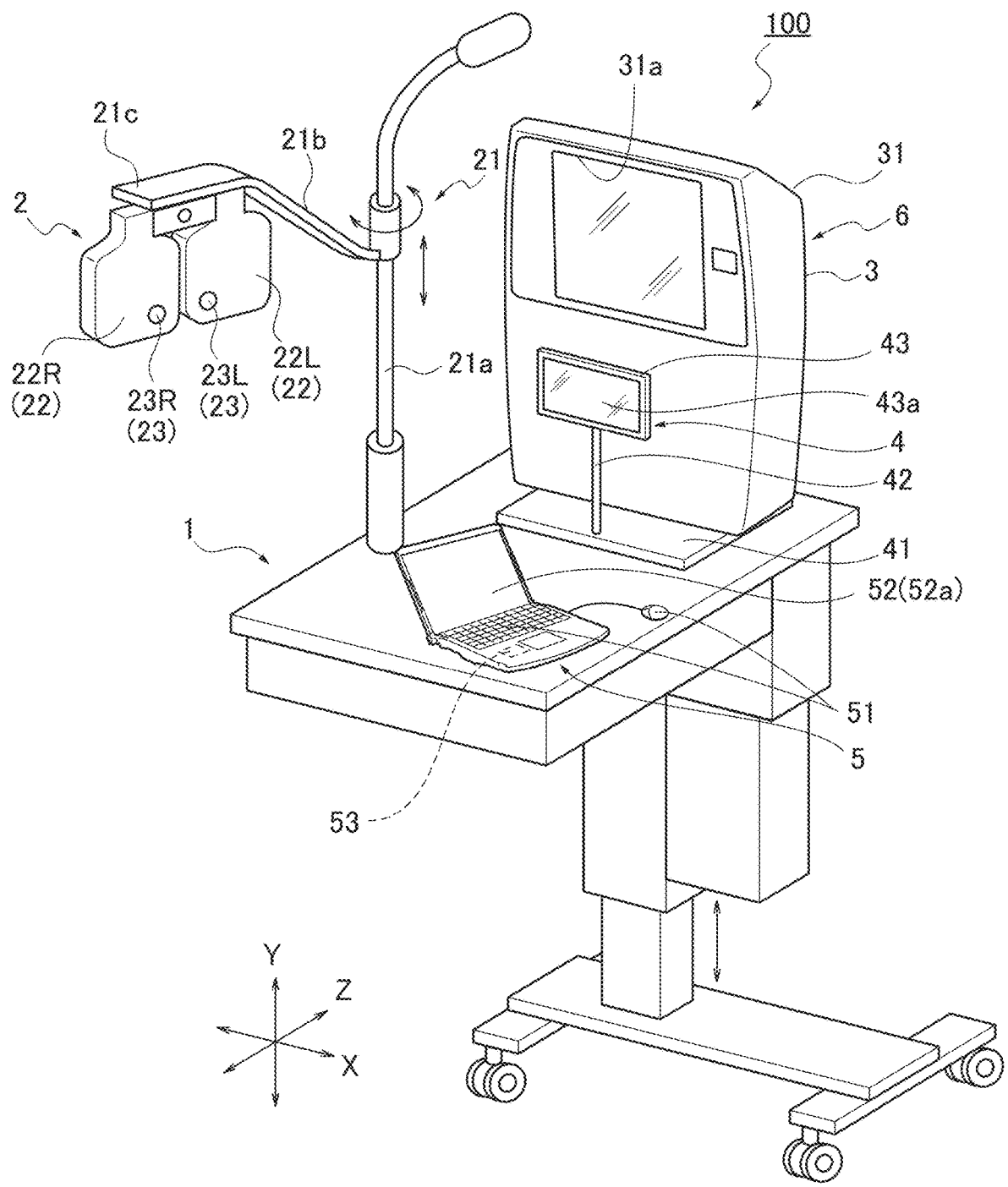
FIG. 1 is a perspective view of the external appearance of an ophthalmologic apparatus according to a first embodiment.

As illustrated in FIG. 1, the ophthalmologic apparatus 100 according to the first embodiment includes an ophthalmologic apparatus body 6 including a vision test table 1, a refractor head 2 as a vision tester, a far-vision visual target presenting device 3 as a first visual target presenting unit, and a near-vision visual target presenting device 4 as a second visual target presenting unit, and a controller 5 as a control device.

Figure 2:
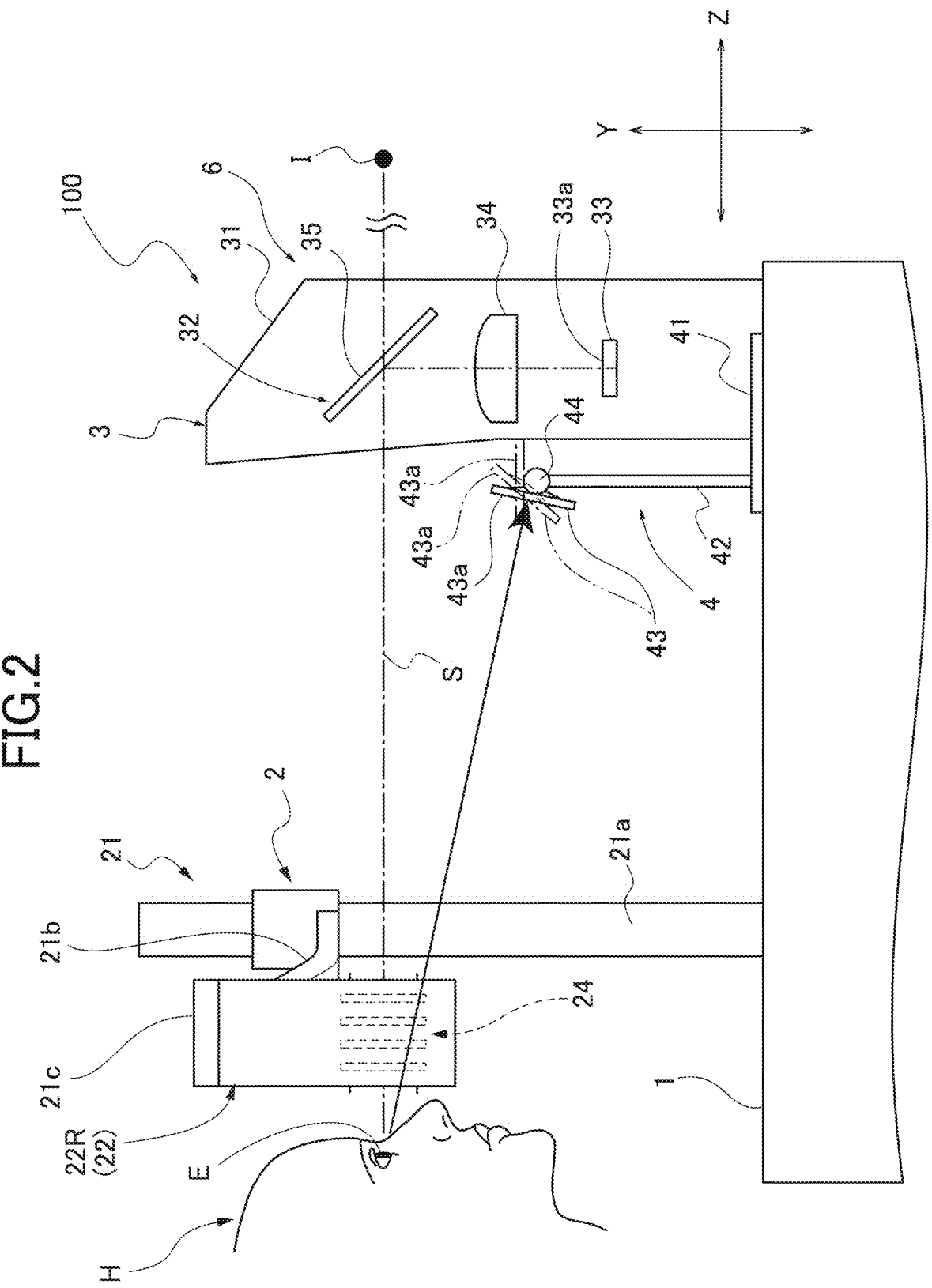
FIG. 2 is a side view of the external appearance of the ophthalmologic apparatus according to the first embodiment.

Note that, when viewed from an examinee H (examinee's eye E) based on the X, Y, and Z axes, for example, as in FIGS. 1 and 2 in the present specification, the left-and-right direction is defined as the X direction, the up-and-down direction (vertical direction) is defined as the Y direction, and the direction orthogonal to the X and Y directions (direction in which the refractor head 2 and the far-vision visual target presenting device 3 face, namely, depth direction) is defined as the Z direction.

The vision test table 1 serves as a table on which various types of devices, such as the refractor head 2, the far-vision visual target presenting device 3, the near-vision visual target presenting device 4, and the controller 5, are placed. The examinee H places its elbows or arms on the vision test table 1 in order to keep its posture proper during examination. The vision test table 1 is movable in the up-and-down direction (Y direction) by hand or by an appropriate drive mechanism. This configuration enables an adjustment in the level of the refractor head 2, the far-vision visual target presenting device 3, and the near-vision visual target presenting device 4 suitable to the level of the examinee's eye E from the floor.

The refractor head 2 serves as an ophthalmologic device that is used to select a lens suitable to the examinee's eye E. The refractor head 2 includes a plurality of trial lenses 24 and selectively disposes a trial lens 24 ahead of the examinee's eye E, enabling refraction examination and other examination with appropriate replacement of the trial lens 24. As illustrated in FIG. 1, the refractor head 2 includes a support mechanism 21 and a pair of vision testing units 22L and 22R.

The support mechanism 21 includes a pole 21a, a support arm 21b, and a support member 21c. The pole 21a is provided on the top of the vision test table 1 and extends in the up-and-down direction (Y direction). As indicated by double-headed arrows in FIG. 1, the pole 21a is extendable and contractable in the up-and-down direction (Y direction) and is rotatable in its circumferential direction by hand or an appropriate drive mechanism. The support arm 21b is provided extending obliquely upward from the pole 21a. The support member 21c is fixed at the leading end of the support arm 21b.

The pair of vision testing units 22L and 22R serves as a device including a left-eye vision testing optical system and a right-eye vision testing optical system provided in pairs left and right so as to correspond to the examinee's left and right eyes E. The pair of vision testing units 22L and 22R is suspended from the support member 21c and is slidable in the left-and-right direction (X direction) by a publicly known sliding mechanism. Thus, the pair of vision testing units 22L and 22R can be made relatively close or spaced apart. The pair of vision testing units 22L and 22R is inserted in or withdrawn from between the examinee's eye E and the far-vision visual target presenting device 3 due to rotation in the circumferential direction of the pole 21a of the support mechanism 21. The vision testing units 22L and 22R in pairs each have its front and back each provided with a vision test window 23L or 23R. The vision testing units 22L and 22R in pairs each include optical members, such as a plurality of left-eye or right-eye trial lenses (corrective lenses) 24, a polarizing filter, and an occluder, disposed inside. For vision testing, the optical members, such as the plurality of trial lenses 24, are selectively disposed so as to face the corresponding vision test windows 23L or 23R by a publicly known drive mechanism not illustrated.

Such a trial lens 24 is used to correct the visual function of the examinee's eye E, and examples thereof include a spherical lens, a cylindrical lens, and a prism. In addition, for examination of an unaided eye, for example, a lens having no function of correction, a glass plate, or a plastic plate can be selected as a trial lens 24. Hereinafter, in a case where no distinction between left and right is required, the vision testing units 22L and 22R are simply referred to as a vision testing unit 22 and the vision test windows 23L and 23R are simply referred to as vision test windows 23.

Note that the vision tester is not limited to the refractor head 2 and may have any configuration in which a trial lens 24 can be disposed ahead of the examinee's eye E (between the examinee's eye E and both of the far-vision visual target presenting device 3 and the near-vision visual target presenting device 4). As the vision tester, provided may be a trial frame 2A (refer to FIG. 4). The trial frame 2A serves as a spectacle-type tool that the examinee H wears. An examiner or the like can selectively dispose a trial lens 24 at a lens receiver 25 by hand. When the trial frame 2A is used together with the ophthalmologic apparatus 100 according to the first embodiment, for example, the refractor head 2 is retreated from the position facing the examinee's eye E to a retreat position, such as a lateral position, by rotation of the support arm 21b and the examinee H having the trial frame 2A worn thereon faces the far-vision visual target presenting device 3 and the near-vision visual target presenting device 4, allowing examination.

The far-vision visual target presenting device 3 is used for examination of the visual function of the examinee H at the time of viewing of a distant object (far-vision examination). The far-vision visual target presenting device 3 is placed on the vision test table 1 and presents, at a far-vision examination distance (first examination distance) ahead of the examinee's eye E through a trial lens 24 in the refractor head 2, a far-vision eye chart 36 (first eye chart, refer to FIG. 3) displaying at least one visual target for far-vision examination 36a (hereinafter, referred to as "far-vision visual target 36a"). The far-vision visual target presenting device 3 includes a housing 31 shaped like a rectangular parallelepiped and a far-vision visual target presenting optical system 32 incorporated in the housing 31. The front face of the housing 31 (side closer to the examinee H) is provided with a window portion 31a through which the examinee H views a far-vision visual target 36a.

As illustrated in FIG. 2, the far-vision visual target presenting optical system 32 includes a first display 33 as a first visual target display unit, a lens 34, and a reflective mirror 35. The first display 33 is achieved by an electronic display device, such as an LCD or an organic EL display. On the basis of an instruction signal from the controller 5, the first display 33 displays, on its display face 33a, the far-vision eye chart 36 displaying a far-vision visual target 36a. In the far-vision visual target presenting optical system 32, the lens 34 refracts a pencil of light from the far-vision visual target 36a displayed on the first display 33, leading to formation of a visual target image (virtual image) I at the far-vision examination distance from the examinee's eye E. The pencil of light having passed through the lens 34 reflects off the reflective mirror 35, so that the visual target image (virtual image) I is presented at the far-vision examination distance ahead of the examinee's eye E. The reflective mirror 35 is variable in the angle of inclination and thus functions as a level adjustment mechanism. That is, in accordance with the position in the level direction of the examinee's eye E (level from the floor face), the angle of inclination of the reflective mirror 35 is adjusted. Thus, even when the level of the examinee's eye E varies, for example, due to height, the far-vision eye chart 36 can be properly presented to the examinee's eye E.

During no far-vision examination, the far-vision visual target presenting device 3 keeps the first display 33 in non-display or a black image in display, so that the far-vision eye chart 36 can be kept in non-display. Thus, for example, in a case where only near-vision examination is continuously conducted with the near-vision visual target presenting device 4, the examinee H can undergo near-vision examination in concentration while gazing at a near-vision eye chart 45.

As the far-vision examination distance, for example, any distance of 1 m to 6 m from the examinee's eye E can be selected, but this is not limiting. Thus, a distance of 6 m or more can be selected. The far-vision visual target presenting device 3 according to the first embodiment presents the visual target image (virtual image) I at a far-vision examination distance of 5 m from the examinee's eye E. Note that the far-vision examination distance is not limited to 5 m and thus may be different from 5 m. For example, preferably, the far-vision examination distance is set in the range of 1 m to 6 m. However, the upper limit is not limited to 6 m, and thus may be 7 m, 8 m, or more. As an examination distance changing mechanism, a magnifying lens and other optical members are disposed in the far-vision visual target presenting optical system 32, so that the far-vision examination distance at which the visual target image (virtual image) I is presented can be changed between 1 m and 6 m (or a distance longer than 6 m) in accordance with the purpose of examination or the detail of examination. In the present specification, an examination distance of 1 m or more is defined as the far-vision examination distance and an examination distance less than 1 m is defined as the near-vision examination distance. However, an examination distance of 1 m to 2 m, further, an examination distance of 1 m to 3 m may be included in the near-vision examination distance. That is, the far-vision examination distance at which the far-vision eye chart 36 is presented can be set in the range of 1 m to 6 m by the far-vision visual target presenting device 3, and the near-vision examination distance at which the near-vision eye chart 45 is presented can be set in the range of 10 cm to 2 m or the range of 10 cm to 3 m by the near-vision visual target presenting device 4 because the far-vision eye chart 36 and the near-vision eye chart 45 are separate members spaced apart from each other. The far-vision examination distance and the near-vision examination distance can be flexibly set in such ranges as above, enabling examination at various examination distances. Products of various types of lenses each having a plurality of focal points, particularly, products of a trifocal or multifocal intraocular lens (IOL) for far vision, near vision, intermediate vision, and the like are available, enabling examination at various examination distances. This is highly beneficial to proper examination or treatment for correction.

The near-vision visual target presenting device 4 is used for examination of the visual function of the examinee H at the time of viewing of a near object (near-vision examination). The near-vision visual target presenting device 4 serves as a second visual target presenting device that presents, at the near-vision examination distance ahead of the examinee's eye E through a trial lens 24 in the refractor head 2, the near-vision eye chart 45 (second eye chart, refer to FIG. 3) displaying at least one visual target for near-vision examination 45a (hereinafter, referred to as "near-vision visual target 45a"). In the first embodiment, the near-vision visual target presenting device 4 is placed on the vision test table 1.

As illustrated in FIGS. 1 and 2, the near-vision visual target presenting device 4 according to the first embodiment includes a substrate 41, a support 42, a second display 43, and a rotating mechanism 44

The substrate 41 is fixed, ahead of the far-vision visual target presenting device 3 (closer to the examinee H), on the vision test table 1. The support 42 serves as a rod member having its lower end fixed to the substrate 41 and having its upper end to which the second display 43 is coupled rotatably through the rotating mechanism 44, such as a rotary shaft.

The second display 43 is achieved by an electronic display device, such as an LCD or an organic EL display. On the basis of an instruction signal form from the controller 5 (control unit 53), the second display 43 displays, on its display face 43a, the near-vision eye chart 45 displaying a near-vision visual target 45a.

As indicated by imaginary lines in FIG. 2, the second display 43 is rotated by the rotating mechanism 44, so that its angle of inclination can be changed freely. Thus, the rotating mechanism 44 functions as a level adjustment mechanism and the examiner or the like changes the angle of inclination of the second display 43, so that the near-vision eye chart 45 can be presented at a proper position corresponding to the level of the examinee's eye E from the floor face.

In the first embodiment, for example, due to the rotating mechanism 44 achieved by the rotary shaft, the examiner or the like rotates the second display 43 by hand, but this configuration is not limiting. For example, the rotating mechanism 44 may include an appropriate drive mechanism, such as an electric motor and the controller 5 may control the drive mechanism, so that the second display 43 can be automatically rotated.

The second display 43 is rotated such that the display face 43a faces upward or backward (toward the far-vision visual target presenting device 3), so that the near-vision eye chart 45 displayed on the second display 43 can be retreated to a position at which no near-vision eye chart 45 is viewed through the trial lens 24. That is, the rotating mechanism 44 functions as a retreat mechanism for the near-vision eye chart 45. For example, for only far-vision examination with the far-vision visual target presenting device 3, such retreat enables further inhibition of the crystalline lens of the examinee's eye E from receiving stimuli in accommodation, so that far-vision examination can be conducted more accurately.

Note that the retreat of the near-vision eye chart 45 is not limited to the rotation of the second display 43, and thus, for example, the second display 43 may be brought into non-display (non-lighting) or a black image may be displayed.

As the near-vision examination distance, for example, any distance of 10 cm to 40 cm from the examinee's eye E can be selected, but this is not limiting. Thus, the near-vision examination distance may be 1 m, 2 m, or 3 m. That is, the near-vision examination distance due to the near-vision visual target presenting device 4 can be set or changed between 10 cm and 3 m. The near-vision visual target presenting device 4 according to the first embodiment has the second display 43 located at a near-vision examination distance of 30 cm.

Note that, in the first embodiment, since the substrate 41 is fixed to the vision test table 1, the position in the depth direction (Z direction) of the second display 43 is fixed, so that the near-vision examination distance is fixed at 30 cm. However, this configuration is not limiting. If the substrate 41 is simply placed on the vision test table 1 without being fixed to the vision test table 1, the near-vision visual target presenting device 4 can be moved to any position in the depth direction (Z direction), so that the near-vision examination distance can be changed to a desired distance. As a result, the examinee H can undergo near-vision examination at a desired near-vision examination distance or at a plurality of different near-vision examination distances.

The far-vision visual target 36a and the near-vision visual target 45a are not particularly limited and thus may be each any visual target usable for examination of the visual function of the examinee's eye E. Specifically, for example, the far-vision visual target 36a and the near-vision visual target 45a may be each a Landolt ring, a Snellen chart, or an E chart, may be each a word in hiragana or katakana, a word in English, a word in every country, a number, a symbol, or a visual target based on a picture, such as an animal or a finger, may be each a particular figure for binocular visual function examination, such as a cross visual target, a landscape picture, or a landscape photograph, or may be each an article in a newspaper or magazine, or a novel, so that various visual targets can be used. The far-vision visual target 36a and the near-vision visual target 45a may be each a still image or a moving image. In the first embodiment, since the far-vision visual target presenting device 3 includes the first display 33, such as an LCD, as a visual target display unit and the near-vision visual target presenting device 4 includes the second display 43, such as an LCD, as a visual target display unit, the far-vision visual target 36a and the near-vision visual target 45a can be each displayed in a desired display mode, such as shape, form, size, number, color, or contrast, so that various subjective examinations can be conducted.

According to the conventional technology, at the time of near-vision examination, a near-vision eye chart is disposed through a near point rod or the like on the line of sight on which a far-vision visual target is viewed by the examinee's eye. Thus, while viewing a near-vision visual target, the examinee H cannot view any far-vision visual target. For viewing of a far-vision visual target, a far-vision eye chart requires presenting after retreat of the near-vision visual target. Therefore, every time far-vision examination and near-vision examination are alternately conducted, the far-vision eye chart and the near-vision eye chart require exchanging for presentation to the examinee's eye E, leading to influence on examination efficiency.

Figure 3:
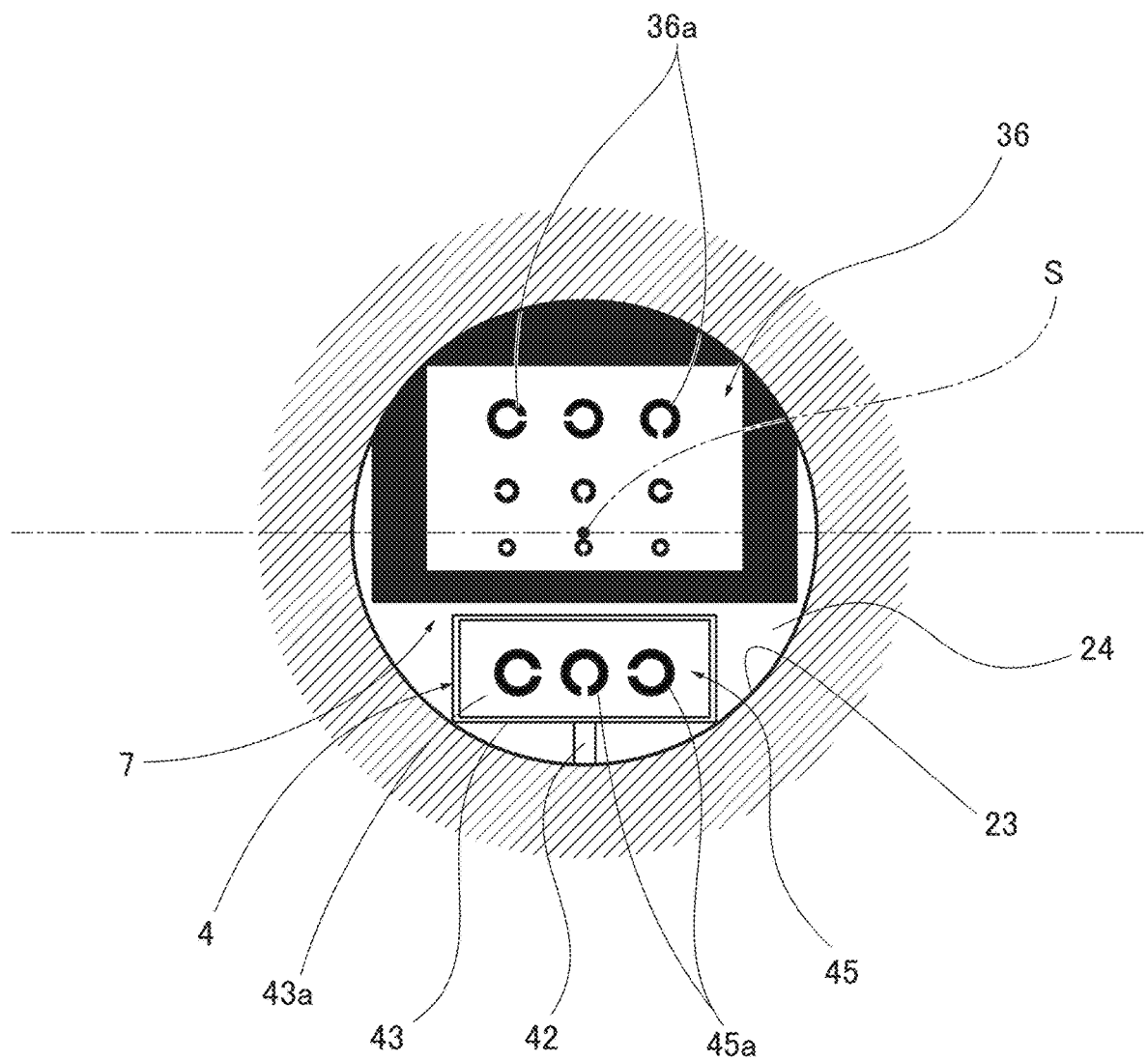
FIG. 3 illustrates a far-vision eye chart and a near-vision eye chart presented to an examinee's eye through a trial lens disposed between vision test windows of a refractor head in the ophthalmologic apparatus according to the first embodiment.

In contrast to this, as illustrated in FIG. 3, in the ophthalmologic apparatus 100 according to the first embodiment, the far-vision eye chart 36 (first eye chart) and the near-vision eye chart 45 (second eye chart) are presented adjacently in plan view in the region in which no influence of aberration of the trial lens 24 is present (hereinafter, referred to as "presentation region 7") within the range viewable by the examinee's eye E through the trial lens 24 (within the field of view of the trial lens 24). The "adjacent presentation in plan view" means that the far-vision eye chart 36 and the near-vision eye chart 45 are presented closely in plan view such that the display region for the far-vision visual target 36a and the display region for the near-vision visual target 45a do not overlap mutually and the direction of line of sight at the time of viewing varies therebetween. In other words, the "adjacent presentation in plan view" further means presentation of the far-vision eye chart 36 and the near-vision eye chart 45 subjected to positioning in the X and Y directions such that, when the examinee H views visual targets through the trial lens 24, the far-vision visual target 36a in the far-vision eye chart 36 disposed far away from the examinee's eye E and the near-vision visual target 45a in the near-vision eye chart 45 disposed close to the examinee's eye E are simultaneously shown side by side in the up-and-down direction of the examinee H (alternatively, in the left-and-right direction or in an oblique direction). Note that, referring to FIG. 3, for description of the positional relationship between the far-vision eye chart 36 and the near-vision eye chart 45, both eye charts are clearly illustrated, namely, both eye charts on which the examinee's eye E is focused are illustrated. In practice, the examinee's eye E is focused on either the far-vision eye chart 36 or the near-vision eye chart 45 as the fixation target of the examinee's eye E.

In the first embodiment, the trial lens 24 is disposed between the vision test windows 23 (23L or 23R) disposed in tandem in the depth direction (Z direction). Thus, the vision test windows 23 each function as a field stop for the trial lens 24. In the first embodiment, the meaning "within the range viewable by the examinee's eye E through the trial lens 24" corresponds to the region inside the far-side vision test window 23 (refer to FIG. 3).

Such simultaneous and adjacent presentation of the far-vision eye chart 36 and the near-vision eye chart 45 in the presentation region 7 enables difference between the direction of line of sight at the time of viewing of the far-vision eye chart 36 and the direction of line of sight at the time of viewing of the near-vision eye chart 45. The examinee H can view the far-vision eye chart 36 and the near-vision eye chart 45 through the (same) trial lens 24. At this time, without changing the orientation of the refractor head 2 or the presentation positions of the far-vision eye chart 36 and the near-vision eye chart 45, only movement of the line of sight of the examinee H is necessary to enable flexible switching of the target to be viewed through the (same) trial lens 24 from the far-vision eye chart 36 to the near-vision eye chart 45 or from the near-vision eye chart 45 to the far-vision eye chart 36. Thus, the examinee H can undergo far-vision examination and near-vision examination continuously or alternately again and again. Saved can be the trouble of presentation exchange between the far-vision eye chart 36 and the near-vision eye chart 45 every time a change is made from either far-vision examination or near-vision examination to the other. As a result, the ophthalmologic apparatus 100 enables a considerable improvement in examination efficiency.

Adjacent presentation of the far-vision eye chart 36 and the near-vision eye chart 45 at positions closer to a principal optical axis S that passes through the lens center of the trial lens 24 enables an improvement in visibility with the far-vision eye chart 36 and the near-vision eye chart 45 disposed at positions at which the influence of aberration of the trial lens 24 is less (i.e., the trial lens 24 does not distort the image of the far-vision eye chart 36 or the near-vision eye chart 45). Then, only slight movement of the line of sight of the examinee H enables viewing with a prompt switch between the far-vision eye chart 36 and the near-vision eye chart 45, leading to a more efficient and proper examination.

The adjacent direction of the far-vision eye chart 36 and the near-vision eye chart 45 (array direction) is not particularly limited and thus may be any of the up-and-down direction, the left-and-right direction, and an oblique direction in plan view. Most preferably, the far-vision eye chart 36 is disposed on the upper side and the near-vision eye chart 45 is disposed on the lower side. This is because, with a pair of bifocal glasses, a contact lens, or an intraocular lens (IOL), based on a bifocal lens or a progressive lens, the examinee H levels, for far viewing, the line of sight in the direction along the principal optical axis S that passes through the lens center, namely, in the straightforward direction and levels, for near-viewing, the line of sight downward. Vertical arrangement of the far-vision eye chart 36 and the near-vision eye chart 45 enables examination appropriate to the practical use of a pair of bifocal glasses or the like and enables more accurate and proper examination and correction of ocular characteristics of the examinee's eye E.

For example, for a prescription for so-called monovision glasses, contact lenses, or intraocular lenses for a far-vision lens as a corrective lens for one examinee's eye E and a near-vision lens as a corrective lens for the other examinee's eye E, examination with not only vertical arrangement of the far-vision eye chart 36 and the near-vision eye chart 45 but also horizontal arrangement of the far-vision eye chart 36 and the near-vision eye chart 45 is effective.

The controller 5 is used by an operator, such as an examiner, in order to operate the ophthalmologic apparatus 100. The controller 5 receives an operation from the examiner and outputs, to the refractor head 2, the far-vision visual target presenting device 3, and the near-vision visual target presenting device 4, an instruction signal corresponding to the operation.

The controller 5 and the refractor head 2, far-vision visual target presenting device 3, and near-vision visual target presenting device 4 of the ophthalmologic apparatus body 6 are connected communicably through short-range wireless communication. Thus, while carrying the controller 5, the examiner can easily operate each device in the ophthalmologic apparatus body 6 at any place. Therefore, for example, the examiner can operate the controller 5 while the examiner itself is viewing a visual target from behind the examinee H or can operate the controller 5 while checking whether the examinee H is gazing at a visual target, on the basis of the line of sight of the examinee's eye E, from ahead of the examinee H.

Examples of standards of short-range wireless communication include Bluetooth (registered trademark) and Wi-Fi (registered trademark). Such short-range wireless communication is high in communication rate and enables inhibition of occurrence of a time lag in transmission and reception of various types of signals. The controller 5 and each device in the ophthalmologic apparatus body 6 may be connected by wire, such as through a cable. In this case, various types of signals can be transmitted and received at a high communication rate with inhibition of occurrence of a time lag.

As illustrated in FIG. 1, mainly, the controller 5 includes an input unit 51 that receives, as an input, an operation instruction from the examiner, a display unit 52 that displays, for example, vision test parameters, examination information, or examination results, and a control unit 53 that controls the entire operation of the ophthalmologic apparatus 100. Note that, for clear and smooth communication between the examiner and the examinee H in operation of the ophthalmologic apparatus body 6 from a separate place or by remote control through the controller 5, the controller 5 and the ophthalmologic apparatus body 6 may be each provided with a microphone and a speaker.

The input unit 51 includes, for example, a keyboard and a mouse. The display unit 52 can be achieved by an electronic display device (display), such as an LCD or an organic EL display. If the display unit 52 is of a touch panel type, the display unit 52 has a display face 52a that functions as the input unit 51. The input unit 51 receives, for example, an instruction for selecting a type of visual target to be displayed on each of the first display 33 of the far-vision visual target presenting device 3 and the second display 43 of the near-vision visual target presenting device 4, an instruction for setting vision test parameters, such as prism power and spherical power, in the refractor head 2, and an instruction for setting the examinee's eye E as the left eye, the right eye, or both thereof.

The control unit 53 includes a microprocessor, a RAM, a ROM, and a storage unit, such as a hard disk. The control unit 53 loads a computer program stored in the storage unit onto, for example, the RAM and executes the computer program to control the operation of the ophthalmologic apparatus 100 in a centralized manner. The storage unit stores, in addition to the computer program, parameters for various types of examinations for vision testing and examination results.

The control unit 53 displays, for example, a menu screen or an examination result screen on the display unit 52. The control unit 53 displays, on the display unit 52, parameters for examination or examination information, in accordance with the operation instruction received as an input by the input unit 51. In accordance with the operation instruction, the control unit 53 drives the drive mechanism to change the power of a refractive lens or the power of a prism disposed between the vision test windows 23L or between the vision test windows 23R.

The control unit 53 transmits, to the far-vision visual target presenting device 3, an instruction signal for displaying, on the display face 33a of the first display 33, the far-vision eye chart 36 selected by the instruction for selecting a visual target to be presented, received by the input unit 51. The control unit 53 transmits, to the near-vision visual target presenting device 4, an instruction signal for displaying, on the display face 43a of the second display 43, the near-vision eye chart 45 selected by the instruction for selecting a visual target to be presented, received by the input unit 51. The control unit 53 controls the first display 33 and the second display 43 between on and off (lighting and non-lighting). That is, in accordance with the purpose of use, the control unit 53 controls the far-vision visual target presenting device 3 and the near-vision visual target presenting device 4 to change, respectively, the display mode of the far-vision visual target 36a for the far-vision eye chart 36 to be displayed on the first display 33 and the display mode of the near-vision visual target 45a for the near-vision eye chart 45 to be displayed on the second display 43 (e.g., shape, form, size, number, color, or contrast).

The controller 5 may be a dedicated controller for vision testing including an input unit 51, a display unit 52, and a control unit 53 or may be a laptop personal computer including a monitor. Alternatively, as the controller 5, provided may be a portable information terminal (information processing device), such as a tablet terminal or a smartphone.

Exemplary operations at the time of far-vision examination and near-vision examination of the examinee's eye E with the ophthalmologic apparatus 100 according to the first embodiment will be described below with reference to FIG. 2. In the following, described will be (1) an examination process in which the far-vision eye chart 36 and the near-vision eye chart 45 are presented simultaneously in the presentation region 7 and far-vision examination and near-vision examination are continuously conducted, and (2) an examination process in which only the far-vision eye chart 36 is presented and far-vision examination is conducted, next only the near-vision eye chart 45 is presented and near-vision examination is conducted, and then the far-vision eye chart 36 and the near-vision eye chart 45 are presented simultaneously in the presentation region 7 and far-vision examination and near-vision examination are alternately conducted. In the following, given will be a procedure in which the examiner conducts examination while sitting toward the vision test table 1 or standing behind the examinee H or aside and accompanying the examinee H in the proximity of the examinee H. However, the place where the examiner is located is not limited to the proximity of the examinee H. For example, at a position in consideration of so-called social distancing to the examinee H, such as a position at an appropriate distance or a position through a partition even in the same room, the examiner may operate the controller 5 to perform the entire process to be described below or part of the process. The examiner may operate the controller 5 in a different room to perform, by short-range wireless or cable connection, the entire process or part of the process. As in an eighth embodiment to be described below, the examiner may operate the controller 5 at a distant place to perform, through a communication network N, the entire process or part of the process. The same applies to second to seventh embodiments.

In the examination process (1), at the time of examination of ocular characteristics of the examinee's eye E with the ophthalmologic apparatus 100, the examiner first rotates the pole 21a to dispose the pair of vision testing units 22L and 22R between the examinee's eye E and the far-vision visual target presenting device 3. The examinee H faces the pair of vision testing units 22L and 22R. The examinee H may face the pair of vision testing units 22L and 22R while standing or sitting on a chair or the like. The examinee H abuts its forehead against a forehead portion not illustrated provided between the vision testing units 22L and 22R in pairs and places its elbows or arms on the vision test table 1, to keep its posture stable for vision testing.

The examiner rotates the second display 43 of the near-vision visual target presenting device 4 such that the second display 43 is disposed at an angle of inclination corresponding to the level of the examinee's eye E.

Then, the examiner operates the input unit 51 of the controller 5 and selects a visual target to be presented for far-vision examination and a visual target to be presented for near-vision examination, to input a selection instruction. When receiving the selection instruction as an input, the control unit 53 of the controller 5 transmits an instruction signal to each of the far-vision visual target presenting device 3 and the near-vision visual target presenting device 4.

When receiving the instruction signal as an input, the far-vision visual target presenting device 3 displays, on the display face 33a of the first display 33, the far-vision eye chart 36 corresponding to the selected visual target to be presented. When receiving the instruction signal as an input, the near-vision visual target presenting device 4 displays, on the display face 43a of the second display 43, the near-vision eye chart 45 corresponding to the selected visual target to be presented.

As above, as illustrated in FIG. 3, the far-vision eye chart 36 and the near-vision eye chart 45 are presented at vertically close range in the proximity of the principal optical axis S of the trial lens 24 in the presentation region 7 in which no influence of aberration of the trial lens 24 is present, in the region viewable by the examinee's eye E through the trial lens 24.

Therefore, the examinee H views the far-vision eye chart 36 from the visual targets presented to the examinee's eye E through the vision test windows 23 and the trial lens 24, so that far-vision examination can be conducted. For example, in accordance with the degree of vision of the examinee H, while operating the controller 5, the examiner appropriately selects a trial lens 24 from the plurality of trial lenses 24 and disposes the trial lens 24 between the vision test windows 23, so that the far-vision examination can continue until correction suitable to the examinee's eye E is achieved.

After termination of the far-vision examination, the examinee H levels its line of sight downward to view the near-vision eye chart 45, so that near-vision examination can be conducted. Therefore, saved can be the trouble required for exchange of the far-vision eye chart 36 with the near-vision eye chart 45. In this case, for example, in accordance with the degree of vision of the examinee H, while operating the controller 5, the examiner appropriately selects a trial lens 24 from the plurality of trial lenses 24 and disposes the trial lens 24 between the vision test windows 23, so that the near-vision examination of the examinee's eye E can continue until correction suitable to the examinee's eye E is achieved.

In the examination process (2), the examiner first rotates the pole 21a to dispose the pair of vision testing units 22L and 22R between the examinee's eye E and the far-vision visual target presenting device 3. The examinee H faces the pair of vision testing units 22L and 22R.

Next, in order to conduct far-vision examination, while operating the input unit 51 of the controller 5, the examiner selects a visual target to be presented for far-vision examination, to input a selection instruction. When receiving the selection instruction as an input, the control unit 53 of the controller 5 transmits an instruction signal to the far-vision visual target presenting device 3. When receiving the instruction signal as an input, the far-vision visual target presenting device 3 displays, on the display face 33a of the first display 33, the far-vision eye chart 36 corresponding to the selected visual target to be presented.

At this time, preferably, due to turning off of the second display 43 of the near-vision visual target presenting device 4, display of a black image, or retreat of the display face 43a out of the field of sight of the examinee's eye E based on rotation of the second display 43, the near-vision eye chart 45 is brought into non-display. Thus, the crystalline lens can be further inhibited from receiving stimuli in accommodation at the time of far-vision examination.

As above, the examinee H views, through the vision test windows 23 and the trial lens 24, the far-vision eye chart 36 presented to the examinee's eye E by the far-vision visual target presenting optical system 32, so that subjective far-vision examination is conducted. Furthermore, for example, in accordance with the degree of vision of the examinee H, while operating the controller 5, the examiner appropriately selects a trial lens 24 from the plurality of trial lenses 24 and disposes the trial lens 24 between the vision test windows 23, so that the far-vision examination of the examinee's eye E can be repeated. As a result, correction of the state of accommodation or heterophoria of the examinee's eye E at the time of viewing of a distant object enables acquisition of far-vision correction data.

Next, in order to conduct near-vision examination, the examiner rotates the second display 43 of the near-vision visual target presenting device 4 such that the second display 43 is disposed at an angle of inclination corresponding to the level of the examinee's eye E. Next, while operating the controller 5, the examiner selects a visual target to be presented for near-vision examination, to input a selection instruction. When receiving the selection instruction as an input, the control unit 53 of the controller 5 transmits an instruction signal to the near-vision visual target presenting device 4. When receiving the instruction signal as an input, the near-vision visual target presenting device 4 displays, on the display face 43a of the second display 43, the near-vision eye chart 45 corresponding to the selected visual target to be presented.

At this time, preferably, due to turning off of the first display 33 of the far-vision visual target presenting device 3 or display of a black image, the far-vision eye chart 36 is brought into non-display (retreated out of the field of sight of the examinee's eye E). Thus, the examinee H can undergo the near-vision examination in concentration while gazing at only the near-vision eye chart 45.

Then, the examinee H views, through the vision test windows 23, the near-vision eye chart 45 presented to the examinee's eye E by the second display 43, so that subjective near-vision examination is conducted. Furthermore, for example, in accordance with the degree of vision of the examinee H, while operating the controller 5, the examiner appropriately selects a trial lens 24 from the plurality of trial lenses 24 and disposes the trial lens 24 between the vision test windows 23, so that the near-vision examination of the examinee's eye E can be repeated. As a result, correction of the state of accommodation or heterophoria of the examinee's eye E at the time of viewing of a near object enables acquisition of near-vision correction data.

Next, described will be a process in which the far-vision eye chart 36 and the near-vision eye chart 45 are presented adjacently in the presentation region 7 of the trial lens 24 and far-vision examination and near-vision examination are alternately and continuously conducted. For example, for a prescription for glasses, a contact lens, or an intraocular lens, the process is favorably performed at the time of final confirmation of whether the prescription data acquired from the prior far-vision examination and near-vision examination is proper or at the time of fine adjustment. Furthermore, for example, at the time of confirmation of the degree of vision of the examinee's eyes E with finished glasses, the degree of vision of the examinee's eye E on which a finished contact lens is put, or the degree of vision of the examinee's eye E in which a finished intraocular lens is inserted, the process is favorably performed.

First, on the basis of the prescription data acquired from the far-vision examination and near-vision examination, the examiner operates the controller 5 to dispose a trial lens 24 between the vision test windows 23 in the refractor head 2. Alternatively, for example, in accordance with the purpose of examination, instead of the refractor head 2, the examinee H may wear, for examination, the trial frame 2A to which a trial lens 24 is attached or the examinee H may wear, for examination, finished glasses or a finished contact lens.

Next, while operating the controller 5, the examiner selects a visual target to be presented for far-vision examination and a visual target to be presented for near-vision examination, to input a selection instruction. When receiving the selection instruction as an input, the control unit 53 of the controller 5 transmits an instruction signal to each of the far-vision visual target presenting device 3 and the near-vision visual target presenting device 4. When receiving the instruction signal as an input, the far-vision visual target presenting device 3 displays, on the display face 33a of the first display 33, the far-vision eye chart 36 corresponding to the selected visual target to be presented. When receiving the instruction signal as an input, the near-vision visual target presenting device 4 displays, on the display face 43a of the second display 43, the near-vision eye chart 45 corresponding to the selected visual target to be presented.

As above, as illustrated in FIG. 3, the far-vision eye chart 36 and the near-vision eye chart 45 are presented simultaneously at vertically close range in the proximity of the principal optical axis S of the trial lens 24 in the presentation region 7 in which no influence of aberration of the trial lens 24 is present, in the region viewable by the examinee's eye E through the trial lens 24.

The examinee H moves its line of sight slightly up and down through the trial lens 24, leading to viewing with a prompt and simple switch between the far-vision eye chart 36 and the near-vision eye chart 45. Thus, without the trouble required for presentation to the examinee's E with a switch between the far-vision eye chart 36 and the near-vision eye chart 45, far-vision examination and near-vision examination can be conducted continuously and repeatedly again and again. Thus, the ophthalmologic apparatus 100 enables more efficient examination of the visual function of the examinee's eye E.

Note that, during far-vision examination with the far-vision eye chart 36 and the near-vision eye chart 45 disposed closely, the near-vision visual target 45a may be in non-display with the second display 43 in non-display (or with a black image in display) in order to inhibit the crystalline lens from receiving stimuli in accommodation. At the time of near-vision examination of the examinee H having its line of sight downward, in order to prompt the examinee H to gaze at the near-vision eye chart 45, the far-vision visual target 36a may be in non-display with the first display 33 in non-display (or with a black image in display).

After that, again, at the time of far-vision examination and near-vision examination with a change in the line of sight, the first display 33 and the second display 43 may be each turned on or off in accordance with examination. In such use, without conventional exchange between the far-vision eye chart and the near-vision eye chart, only turning on or off each of the first display 33 and the second display 43 enables presentation to the examinee's eye E with a simple and prompt switch between the far-vision eye chart 36 and the near-vision eye chart 45, so that far-vision examination and near-vision examination can be efficiently conducted.

Second Embodiment

The configuration of an ophthalmologic apparatus 100A according to a second embodiment will be described below with reference to FIG. 4. The ophthalmologic apparatus 100A according to the second embodiment has the same basic configuration as the ophthalmologic apparatus 100 according to the first embodiment, except that a trial frame 2A is provided instead of a refractor head 2 and a near-vision visual target presenting device 4A is provided instead of a near-vision visual target presenting device 4. Thus, constituent elements the same as those according to the first embodiment are denoted with the same reference signs and the detailed descriptions thereof will be omitted. Constituent elements different from those according to the first embodiment will be mainly described below. The same applies to third to eighth embodiments to be described below.

Figure 4:
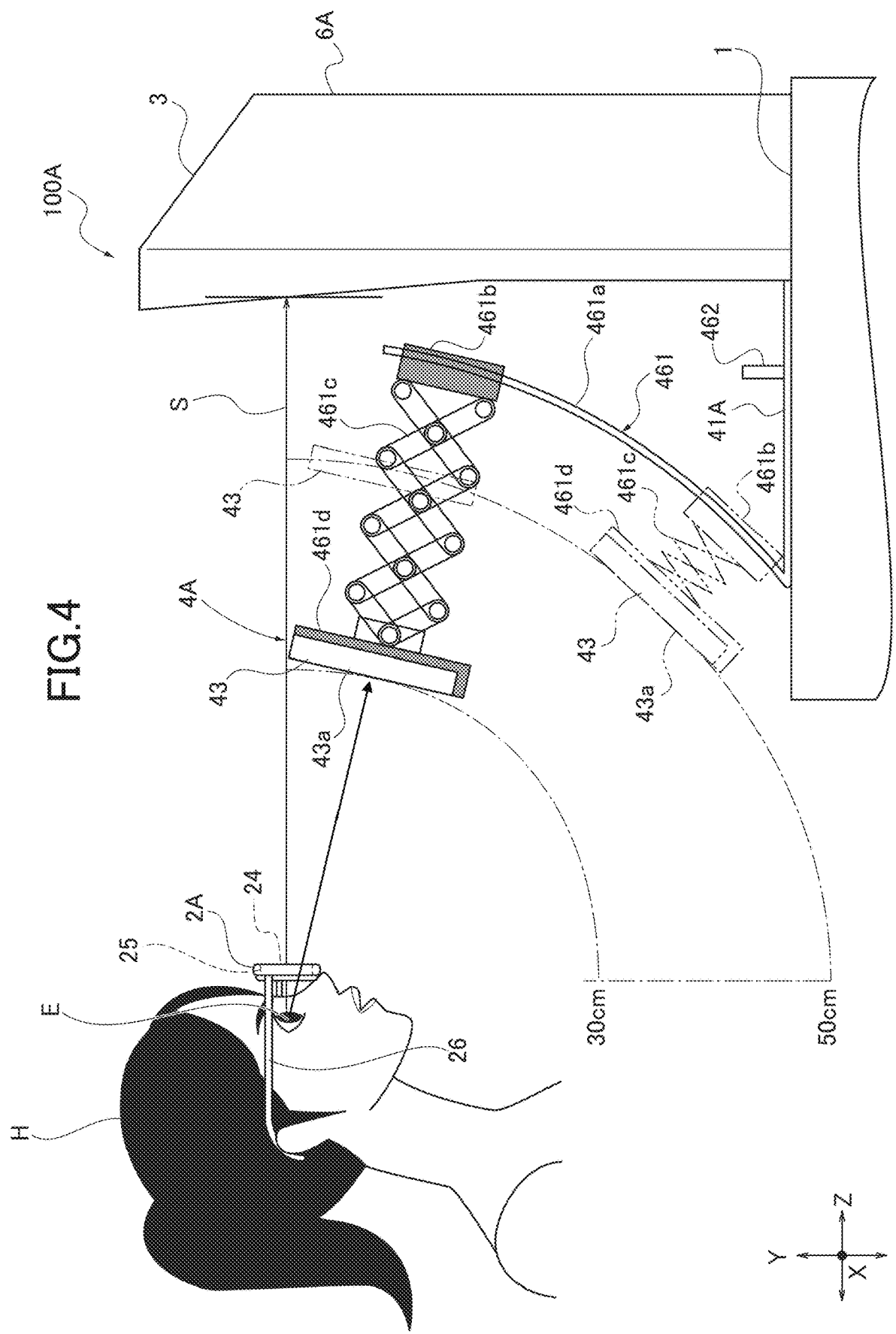
FIG. 4 is a side view of the external appearance of an ophthalmologic apparatus according to a second embodiment.

As illustrated in FIG. 4, the ophthalmologic apparatus 100A according to the second embodiment includes an ophthalmologic apparatus body 6A including a vision test table 1, a far-vision visual target presenting device 3 as a first visual target presenting unit, and the near-vision visual target presenting device 4A as a second visual target presenting unit, and a controller 5 as a control unit (not illustrated in FIG. 4, for example, refer to FIG. 1). The ophthalmologic apparatus 100A as above enables use of a publicly known trial frame 2A as a vision tester for correction of the visual function of an examinee's eye E. The trial frame 2A serves as a spectacle-type tool including, for example, a lens receiver 25 and a temple 26. An examiner or the like can selectively dispose a trial lens 24 at the lens receiver 25 by hand. The ophthalmologic apparatus 100A may include a refractor head 2, and examination with the refractor head 2 may be conducted.

The vision test table 1 and the far-vision visual target presenting device 3 may be similar to those according to the first embodiment. Meanwhile, the near-vision visual target presenting device 4A according to the second embodiment includes a substrate 41A, a moving mechanism 461, and a second display 43.

The substrate 41A is fixed or placed, ahead of the far-vision visual target presenting device 3 (closer to the examinee H), on the vision test table 1. The substrate 41A is provided rotatably in the left-and-right direction around the Y axis as an axis of rotation on the vision test table 1. The examiner or the like rotates the substrate 41A while holding a lever 462 provided on the substrate 41A, so that the near-vision visual target presenting device 4A can be disposed ahead of the far-vision visual target presenting device 3 (below a window portion 31a) or can be retreated laterally such that no near-vision eye chart 45 can be viewed through the trial lens 24. Therefore, the substrate 41A and the lever 462 function as a retreat mechanism for the near-vision eye chart 45.

The moving mechanism 461 is provided on the substrate 41A. The moving mechanism 461 has a function of moving the second display 43 in the up-and-down direction (Y direction) and in the depth direction (Z direction). The moving mechanism 461 includes a rail 461a extending upward from the substrate 41A like an arc with the examinee's eye E as the center of rotation, a slider 461b attached to the rail 461a movably in the up-and-down direction (Y direction) along the rail 461a, an expander 461c that has one end fixed to the slider 461b and extends or contracts in the depth direction, and a tray 461d fixed to the other end of the expander 461c. The second display 43 is placed on the tray 461d.

The second display 43 according to the second embodiment is achieved by an electronic display device, such as an LCD, but this is not limiting. As the second display 43, used can be a portable information terminal, such as a smartphone, a mobile phone, or a tablet terminal, having an LCD or the like and having an application for examination preinstalled therein. A second visual target display unit is not limited to an electronic display device or a portable information terminal. As the second visual target display unit, used can be an eye chart, made of a sheet of paper, a metallic plate, or a plastic plate, on which a visual target is printed.

Provision of a single rail 461a, a single slider 461b, and a single expander 461c enables achievement of a simpler and inexpensive near-vision visual target presenting device 4A. Provision of a plurality of rails 461a, a plurality of sliders 461b, and a plurality of expanders 461c with the tray 461d coupled to the leading ends of the plurality of expanders 461c enables the moving mechanism 461 to move the second display 43 more stably and an improvement in the durability of the moving mechanism 461.

In the ophthalmologic apparatus 100A according to the second embodiment, up-and-down movement of the slider 461b of the moving mechanism 461 along the rail 461a enables up-and-down movement of the second display 43. Therefore, as indicated by solid lines in FIG. 4, upward movement of the second display 43 enables a near-vision visual target 45a to be disposed adjacently to a far-vision eye chart 36 in plan view in a presentation region 7 in which no influence of aberration of the trial lens 24 is present, in the region viewable by the examinee's eye E through the trial lens 24 (within the field of view of the trial lens 24). Thus, only movement of the line of sight of the examinee H enables flexible switching of the target to be viewed through the trial lens 24 between a far-vision visual target 36a and the near-vision visual target 45a. Note that a trial lens 24 to be attached to the trial frame 2A is less in aberration than that in the case of the refractor head 2. Thus, use of the trial frame 2A broadens the presentation region 7 in which no influence of aberration of the trial lens 24 is present. For example, with the near-vision visual target 45a disposed relatively lower, even large movement of the line of sight of the examinee H enables viewing of the near-vision visual target 45a with no influence of aberration. That is, achieved can be examination based on a minimum amount of movement of line of sight due to as short an adjacent distance of the near-vision visual target 45a to the far-vision visual target 36a as possible within the presentation region 7, examination based on a larger amount of movement of line of sight due to a longer adjacent distance between the far-vision visual target 36a and the near-vision visual target 45a, or examination based on stepwise changes in the amount of movement of line of sight. As indicated by imaginary lines in FIG. 4, movement of the second display 43 to a lower retreat position enables retreat of the near-vision visual target 45a out of the presentation region 7.

Detachment of the second display 43 from the tray 461d enables retreat of the near-vision visual target 45a out of the presentation region 7. Furthermore, as described above, lateral movement of the near-vision visual target presenting device 4 due to rotation of the substrate 41 with the lever 462 held enables retreat of the near-vision visual target 45a out of the presentation region 7. That is, the moving mechanism 461 functions as a retreat mechanism for the near-vision eye chart 45.

A change in the angle of inclination of the second display 43 to the expander 461c due to rotation of the second display 43 around the X axis enables disposition of the near-vision eye chart 45 corresponding to the level of the examinee's eye E. Extension or contraction of the expander 461c enables the near-vision examination distance from the examinee's eye E to the second display 43 (second examination distance) to be changed in any range (e.g., the range of 30 to 50 cm). Thus, the examinee H can undergo examination of its degree of vision at various near-vision examination distances (near-vision examination). That is, the moving mechanism 461 functions as an examination distance changing mechanism that changes the near-vision examination distance.

Third Embodiment

Figure 5:
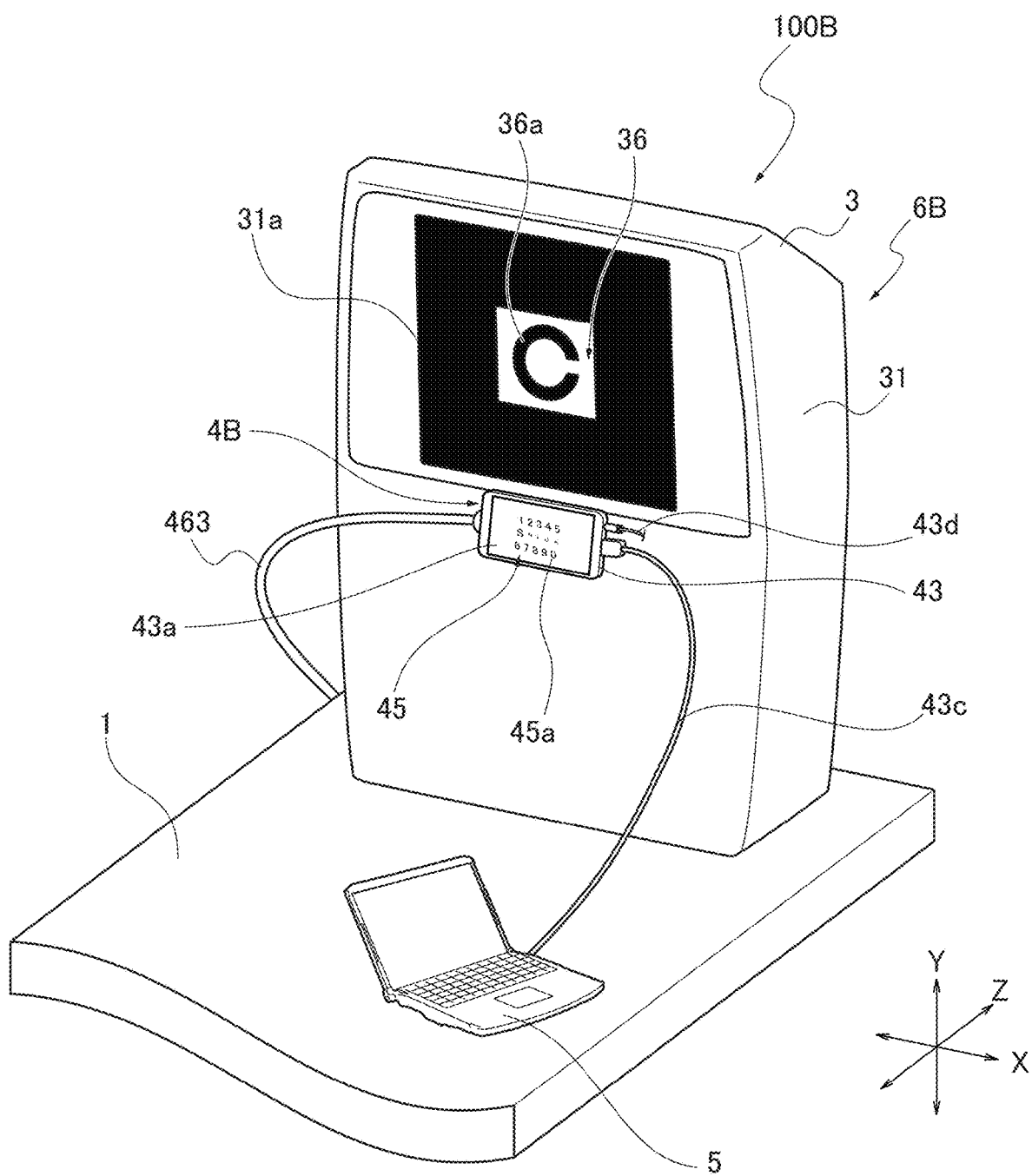
FIG. 5 is a perspective view of the external appearance of an ophthalmologic apparatus according to a third embodiment.

The configuration of an ophthalmologic apparatus 100B according to a third embodiment will be described below with reference to FIGS. 5 and 6. The ophthalmologic apparatus 100B according to the third embodiment has the same basic configuration as the ophthalmologic apparatus 100 according to the first embodiment, except that a near-vision visual target presenting device 4B is provided as illustrated in FIG. 5 instead of a near-vision visual target presenting device 4. The ophthalmologic apparatus 100B includes an ophthalmologic apparatus body 6B including a vision test table 1, a refractor head 2, a far-vision visual target presenting device 3, and the near-vision visual target presenting device 4B, and a controller 5 as a control unit.

As illustrated in FIG. 5, the near-vision visual target presenting device 4B according to the third embodiment includes a flexible arm 463 and a second display 43. The flexible arm 463 functions as a moving mechanism, a retreat mechanism, and an examination distance changing mechanism for a near-vision eye chart 45.

The flexible arm 463 is achieved by a member having flexibility and has one end fixed to or detachably attached to the vision test table 1. The flexible arm 463 has the other end coupled to the second display 43, such as an LCD. Therefore, in the third embodiment, three-dimensional deformation of the flexible arm 463 enables disposition of the second display 43 at any of upper, lower, left, right, and diagonal positions to a window portion 31a, ahead of the far-vision visual target presenting device 3 and enables lateral retreat or back retreat of the near-vision eye chart 45 to the far-vision visual target presenting device 3 such that no near-vision eye chart 45 can be viewed by an examinee's eye E.

The second display 43 is connected to the controller 5 through a USB cord 43c, enabling transmission and reception of each signal. The second display 43 is supplied with power through a power cord 43d. On the basis of an instruction signal from the controller 5, the second display 43 displays, on its display face 43a, the near-vision eye chart 45 including a plurality of visual targets 45a.

Figure 6:
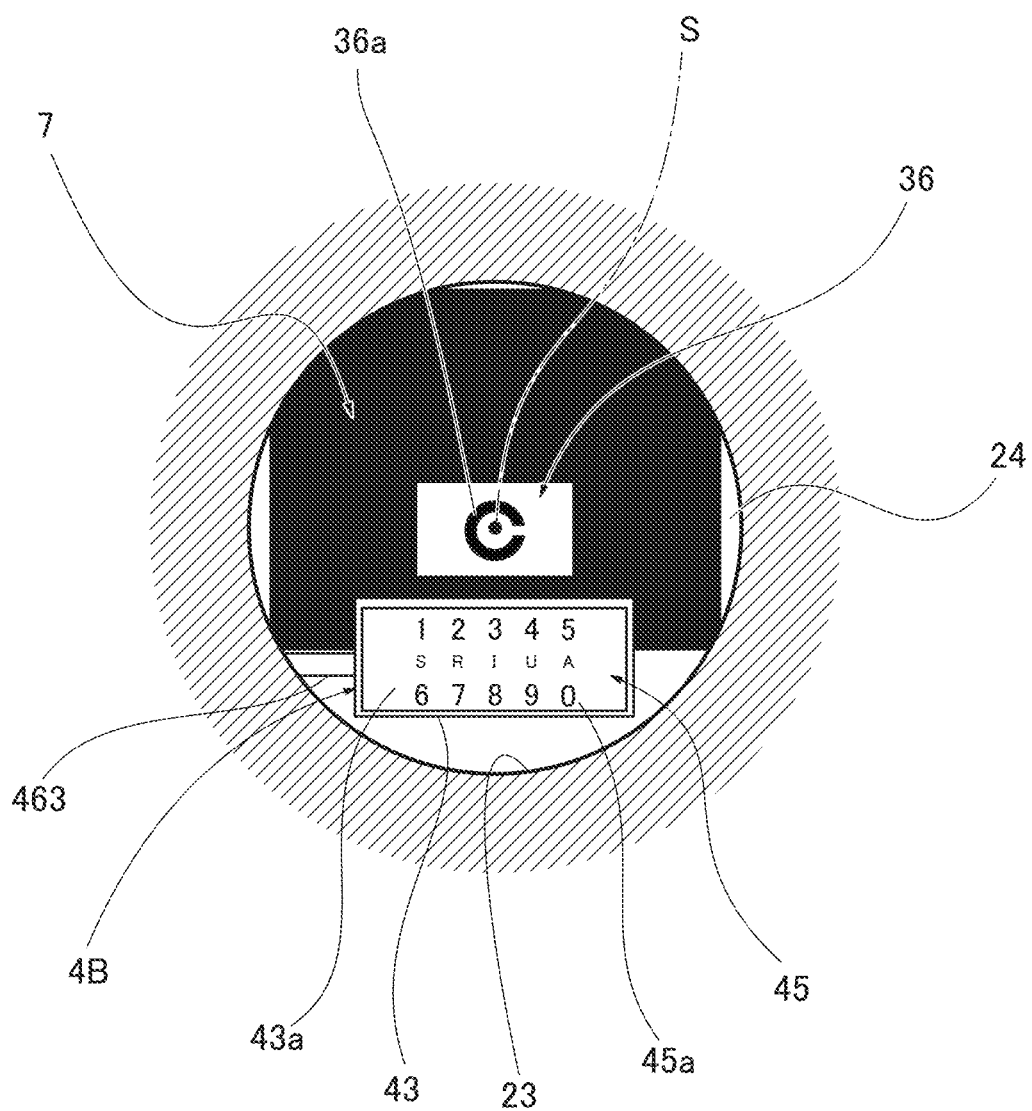
FIG. 6 illustrates a far-vision eye chart and a near-vision eye chart presented to an examinee's eye through a trial lens disposed between vision test windows of a refractor head in the ophthalmologic apparatus according to the third embodiment.

In the third embodiment, as illustrated in FIGS. 5 and 6, the far-vision visual target presenting device 3 displays, in the proximity of a principal optical axis S, a single far-vision visual target 36a in a far-vision eye chart 36 to be presented to the examinee's eye E, so that a less display region is given for the far-vision visual target 36a in a presentation region 7. Thus, the near-vision visual targets 45a in the near-vision eye chart 45 can be presented closer to the far-vision visual target 36a in a region near the principal optical axis S. As a result, with further inhibition of the influence of aberration of a trial lens 24, the examinee H can properly view such a far-vision visual target 36a and a near-vision visual target 45a, so that far-vision examination and near-vision examination can be conducted more accurately and efficiently.

In the example illustrated in FIG. 6, since a single far-vision visual target 36a is displayed, a region in which no far-vision visual target 36a is displayed is provided not only at a lower portion but also at upper, left, right, and diagonal portions in the presentation region 7. Thus, the near-vision eye chart 45 (second display 43) can be disposed at an upper, left, right, or diagonal position close to the far-vision eye chart 36. Use of the flexible arm 463 enables flexible and simple disposition of the second display 43 at any position adjacent to the far-vision eye chart 36 presented on the window portion 31a.

Note that, if the display region for the far-vision visual target 36a can be reduced, the number of far-vision visual targets 36a in the far-vision eye chart 36 is not limited to one. A plurality of far-vision visual targets 36a may be arrayed so as to be displayed in a row in the left-and-right direction. Alternatively, a plurality of far-vision visual targets 36a may be disposed at an upward (or left, right, downward, or diagonally) off-center position in the presentation region 7. In this case, due to the flexible arm 463, the near-vision eye chart 45 (second display 43) can be disposed, close to the far-vision visual targets 36a, in the region in which no far-vision visual target 36a is displayed.

Fourth Embodiment

The configuration of an ophthalmologic apparatus 100C according to a fourth embodiment will be described below with reference to FIGS. 7A and 7B. The ophthalmologic apparatus 100C according to the fourth embodiment has the same basic configuration as the ophthalmologic apparatus 100 according to the first embodiment, except that a near-vision visual target presenting device 4C is provided as illustrated in FIG. 7 instead of a near-vision visual target presenting device 4. The ophthalmologic apparatus 100C includes an ophthalmologic apparatus body 6C including a vision test table 1, a refractor head 2, a far-vision visual target presenting device 3, and the near-vision visual target presenting device 4C, and a controller 5 as a control unit.

Figure 7A:
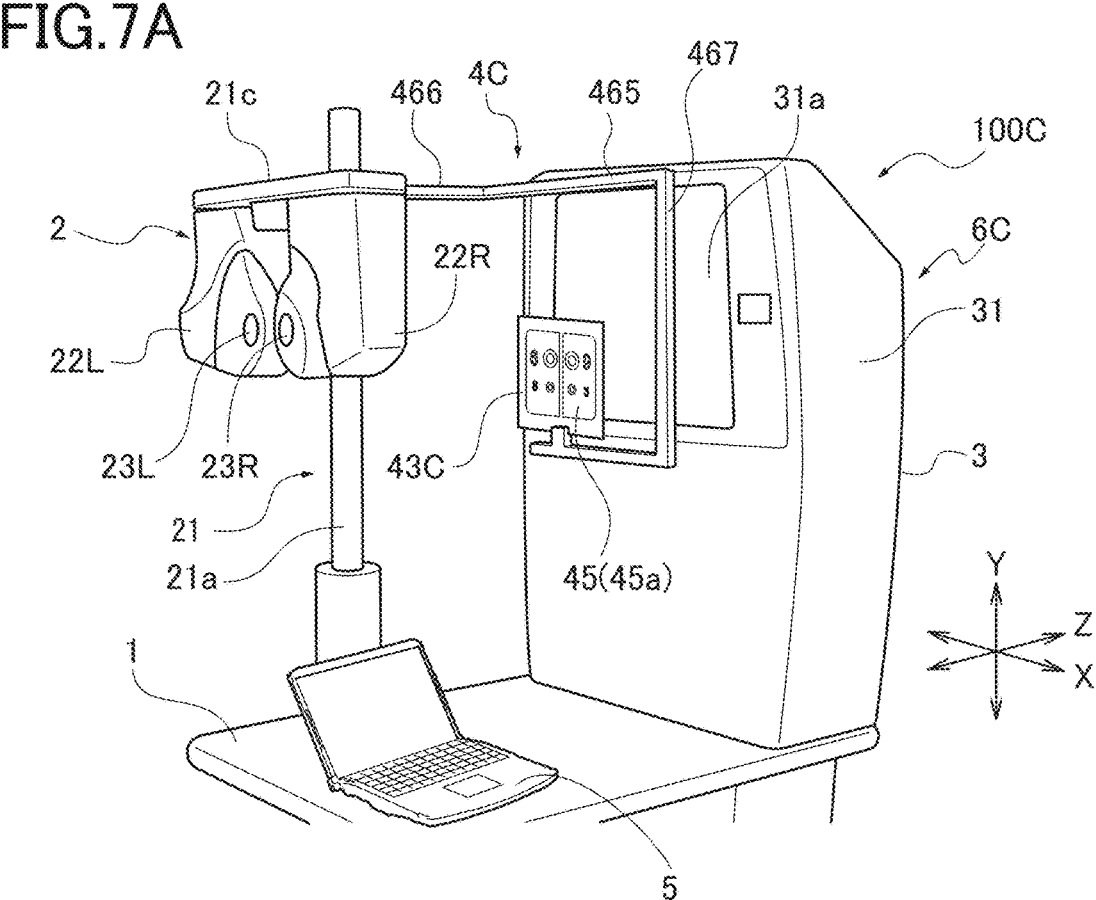
FIGS. 7A and 7B are, respectively, a perspective view and a side view of the external appearance of an ophthalmologic apparatus according to a fourth embodiment.
Figure 7B:
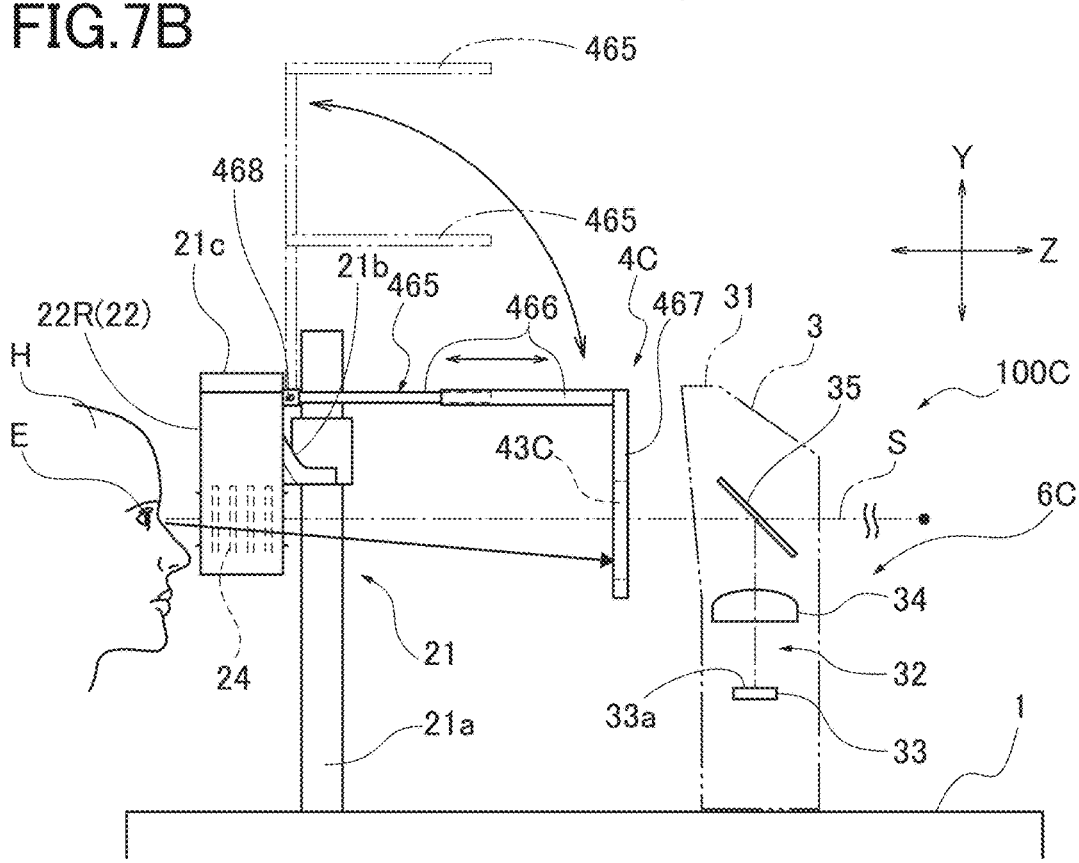

As illustrated in FIGS. 7A and 7B, the near-vision visual target presenting device 4C according to the fourth embodiment includes a suspension portion 465 including a first support arm 466, a second support arm 467, and a rotating portion 468, and a near-vision visual target display board 43C as a second visual target display unit.

The suspension portion 465 has a function of suspending and presenting the near-vision visual target display board 43C ahead of the far-vision visual target presenting device 3 and functions as a retreat mechanism for the near-vision visual target display board 43C. Furthermore, the suspension portion 465 functions as an examination distance changing mechanism that changes the near-vision examination distance of the near-vision visual target display board 43C. The first support arm 466 extends toward the far-vision visual target presenting device 3 (in the Z direction) and has one end coupled to a support member 21c of a support mechanism 21 of the refractor head 2 through the rotating portion 468 such that the first support arm 466 is rotatable around the X axis through the rotating portion 468. The first support arm 466 has a telescopic structure in which two or more pipes different in diameter are combined telescopically. The first support arm 466 is telescopic to the refractor head 2 and thus functions as the examination distance changing mechanism. The first support arm 466 has the other end to which one end of the second support arm 467 is fixed. For example, the second support arm 467 is made of a U-shaped pipe, in plan view, extending along the outer circumference of a window portion 31a of the far-vision visual target presenting device 3 so as to avoid the window portion 31a. The second support arm 467 has the other end to which the near-vision visual target display board 43C is attached. Note that the second support arm 467 is not limited to such a U-shaped pipe and thus may be, for example, a member formed of a wire shaped like a U or quadrangle, resulting in being more inconspicuous and being unlikely to obstruct, for example, a field of sight.

The near-vision visual target display board 43C is formed of a plate, made of paper, resin, metal, or wood, on which a near-vision visual target 45a (near-vision eye chart 45) is indicated. In accordance with the purpose of examination, an appropriate near-vision visual target display board 43C on which various near-vision visual targets 45a are displayed can be attached to the second support arm 467. The near-vision visual target display board 43C is not limited to such a plate, and thus may be an electronic display device, such as an LCD, or a portable information terminal.

In the fourth embodiment, as illustrated in FIGS. 7A and 7B, the near-vision visual target display board 43C is disposed, by the suspension portion 465, on the lower side of the window portion 31a between the refractor head 2 and the far-vision visual target presenting device 3, so that the near-vision visual target display board 43C is suspended to the refractor head 2. Thus, a far-vision eye chart 36 and the near-vision visual target 45a can be disposed closely in a presentation region 7, so that far-vision examination and near-vision examination can be continuously conducted. Extension or contraction of the first support arm 466 enables near-vision examination at a desired near-vision examination distance or near-vision examination at a plurality of near-vision examination distances.

In a case where the near-vision eye chart 45 is not used, the first support arm 466 is rotated to the near side (toward the examinee H) through the rotating portion 468 to dispose the near-vision visual target presenting device 4C above the refractor head 2 as indicated by imaginary lines in FIG. 7B, so that the near-vision eye chart 45 can be retreated out of the presentation region 7. As a result, the examinee H can properly undergo far-vision examination with the far-vision visual target presenting device 3. Contraction of the first support arm 466 enables compact storage of the near-vision visual target presenting device 4C or movement of the near-vision visual target presenting device 4C ahead of the far-vision visual target presenting device 3 without any problem even with a narrow space to the far-vision visual target presenting device 3. The plurality of pipes of the first support arm 466 may be separable. Any pipe, different from the pipe coupled to the support member 21c, may be removed for retreat together with the second support arm 467 and the near-vision visual target display board 43C. At the time of near-vision examination, any removed pipe may be attached to the pipe such that the near-vision visual target presenting device 4C is disposed ahead of the far-vision visual target presenting device 3.

Fifth Embodiment

Figure 8:
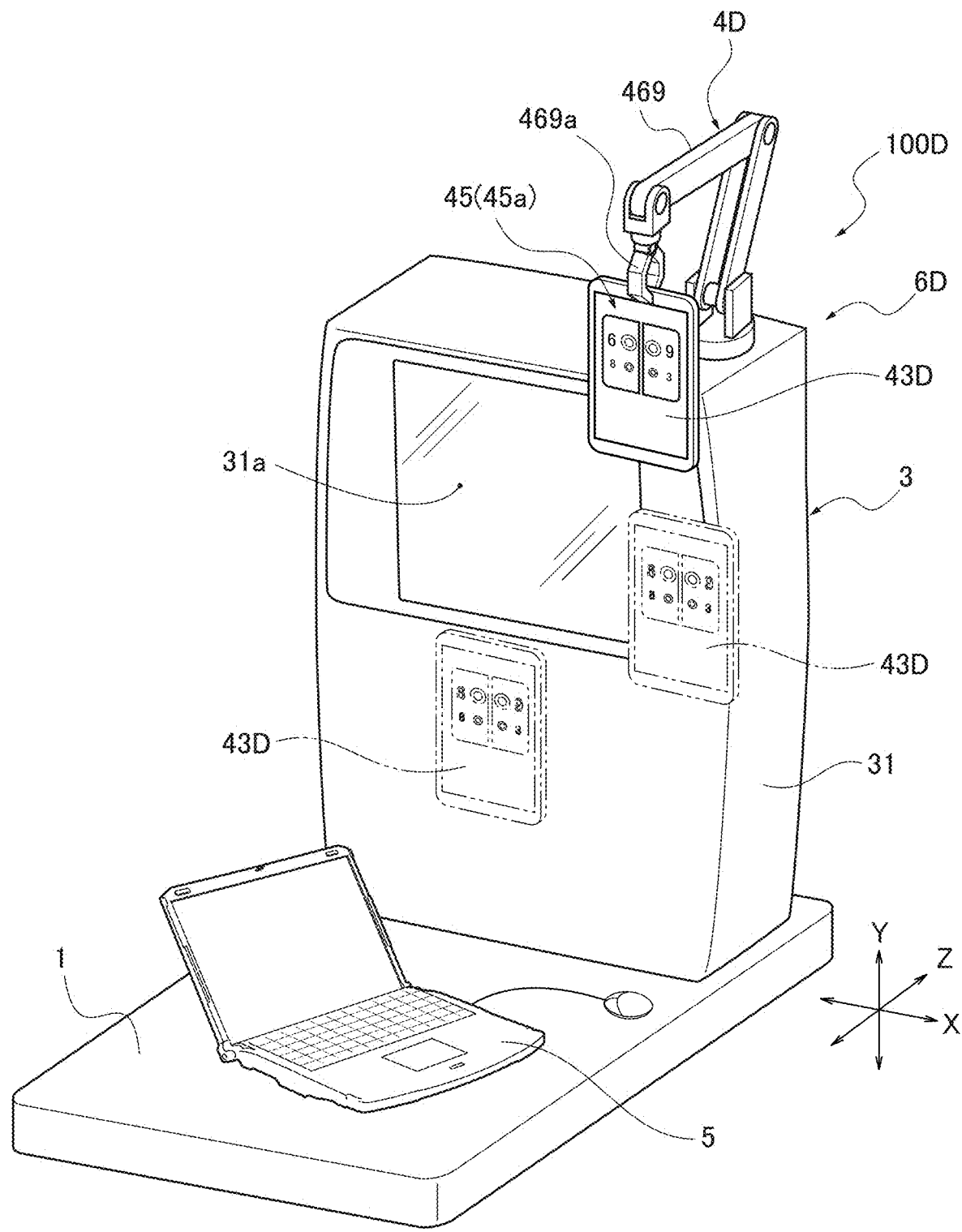
FIG. 8 is a perspective view of the external appearance of an ophthalmologic apparatus according to a fifth embodiment.

The configuration of an ophthalmologic apparatus 100D according to a fifth embodiment will be described below with reference to FIG. 8. The ophthalmologic apparatus 100D according to the fifth embodiment has the same basic configuration as the ophthalmologic apparatus 100 according to the first embodiment, except that a near-vision visual target presenting device 4D is provided as illustrated in FIG. 8 instead of a near-vision visual target presenting device 4. The ophthalmologic apparatus 100D includes an ophthalmologic apparatus body 6D including a vision test table 1, a refractor head 2, a far-vision visual target presenting device 3, and the near-vision visual target presenting device 4D, and a controller 5 as a control unit.

As illustrated in FIG. 8, the near-vision visual target presenting device 4D according to the fourth embodiment includes a robot arm 469 having multiple joints and a second display (that is, for example, but not limited to, a tablet terminal) 43D as a second visual target display unit. The robot arm 469 is connected to the controller 5, for example, by short-range wireless, enabling transmission and reception of each signal. An examiner operates the controller 5, so that the operation of the robot arm 469 can be controlled remotely.

The robot arm 469 is attached to a housing 31 of the far-vision visual target presenting device 3, but this is not limiting. The robot arm 469 may be attached to any part of the ophthalmologic apparatus body 6D, such as the vision test table 1, or may be attached to a part different from the ophthalmologic apparatus body 6D, such as the floor face, the ceiling, or a wall face).

The robot arm 469 grasps the second display 43D through an end effector 469a. Used can be a near-vision visual target display unit similar to the near-vision visual target display board 43C according to the fourth embodiment. In accordance with the purpose of examination, an appropriate near-vision visual target display board 43C can be attached. The robot arm 469 not only has a function of presenting the second display 43D but also functions, for example, as a retreat mechanism for a near-vision eye chart 45 and an examination distance changing mechanism for a near-vision examination distance.

In the fifth embodiment, as indicated by imaginary lines in FIG. 8, the robot arm 469 can dispose the second display 43D at any position, such as a lower position or a lateral position, to a window portion 31a between the refractor head 2 and the far-vision visual target presenting device 3. The robot arm 469 can change freely the near-vision examination distance at which the second display 43D is presented. Thus, the second display 43D can be disposed at a desired near-vision examination distance such that a far-vision eye chart 36 and a near-vision visual target 45a are close in a presentation region 7, so that far-vision examination and near-vision examination can be continuously conducted and additionally various types of examination can be conducted.

In a case where the near-vision eye chart 45 is not used, for example, as indicated by solid lines in FIG. 8, the near-vision visual target presenting device 4D is disposed above the refractor head 2 by the robot arm 469. Thus, the near-vision eye chart 45 can be retreated out of the presentation region 7. As a result, the examinee H can properly undergo only far-vision examination with the far-vision visual target presenting device 3.

Sixth Embodiment

Figure 9:
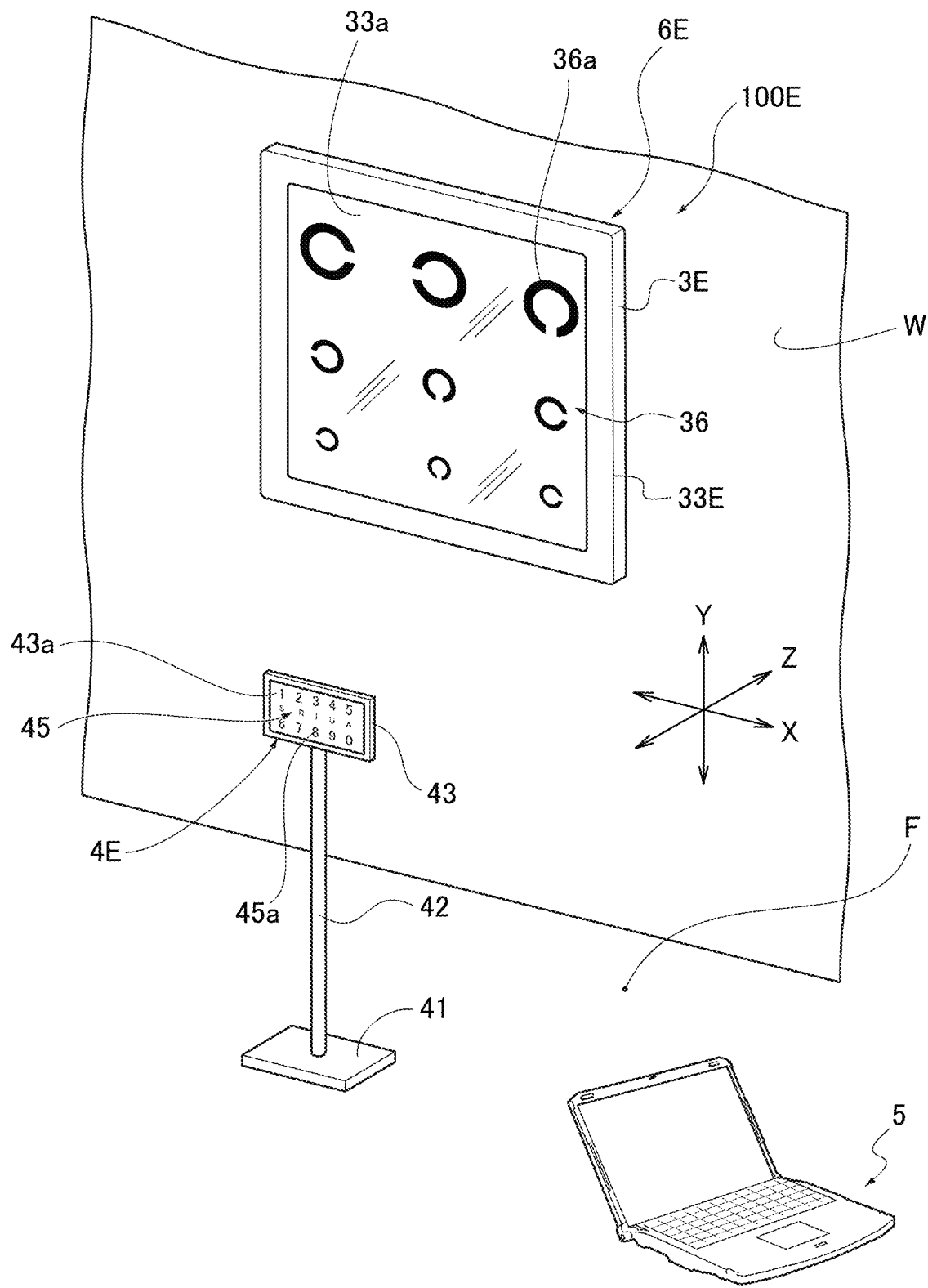
FIG. 9 is a perspective view of the external appearance of an ophthalmologic apparatus according to a sixth embodiment.

The configuration of an ophthalmologic apparatus 100E according to a sixth embodiment will be described below with reference to FIG. 9. In the first to fifth embodiments, provided is the far-vision visual target presenting device 3 that forms the visual target image (virtual image) I at the far-vision examination distance. The ophthalmologic apparatus 100E according to the sixth embodiment includes a far-vision visual target presenting device 3E that presents the real image of a far-vision visual target 36a to an examinee's eye E with a far-vision eye chart 36 disposed at a far-vision examination distance.

The ophthalmologic apparatus 100E according to the sixth embodiment includes an ophthalmologic apparatus body 6E including the far-vision visual target presenting device 3E and a near-vision visual target presenting device 4E, and a controller 5. Although not illustrated in FIG. 9, the ophthalmologic apparatus body 6E further includes a refractor head 2 and/or a trial frame 2A. The ophthalmologic apparatus 100E may include a vision test table 1 on which, for example, the controller 5 or a trial-lens set for the trial frame 2A is placed.

The far-vision visual target presenting device 3E according to the sixth embodiment includes a first display 33E large in size, such as an LCD, as a visual target display unit for the far-vision visual target 36a. The first display 33E is attached to a wall face W in a building, but may be attached to, for example, a rack. The first display 33E is connected to the controller 5, for example, by short-range wireless, enabling transmission and reception of each signal. Under control of the controller 5, the first display 33E displays a far-vision visual target 36a (far-vision eye chart 36) on its display face 33a.

The near-vision visual target presenting device 4E according to the sixth embodiment includes a substrate 41 placed on a floor face F in the building, a support 42 extending upward (Y direction) from the substrate 41, and a second display 43 as a near-vision visual target display unit attached to the leading end of the support 42.

In the sixth embodiment, the near-vision visual target presenting device 4E is disposed so as not to overlap any far-vision visual target 36a in the far-vision eye chart 36 displayed on the first display 33E, at a near-vision examination distance between the examinee H and the far-vision visual target presenting device 3E. Thus, the far-vision eye chart 36 and a near-vision eye chart 45 can be presented closely in a presentation region 7 in which no influence of aberration of a trial lens 24 is present, within the range viewable by the examinee's eye E through the trial lens 24 in the refractor head 2 or through the trial lens 24 in the trial frame 2A. Thus, the examinee H can undergo far-vision examination and near-vision examination continuously.

In a case where the near-vision eye chart 45 is not used, retreat of the near-vision visual target presenting device 4E at a position away from the far-vision visual target presenting device 3E enables the examinee H to properly undergo far-vision examination with the far-vision visual target presenting device 3E. The support 42 may be extendable and contractable and may function as a level adjustment mechanism. Extension or contraction of the support 42 may cause the second display 43 to move to a retreat position or a viewable position.

In the sixth embodiment and a seventh embodiment to be described below, instead of the first display 33E or the second display 43, a plate, made of paper, resin, metal, or wood, on which a far-vision visual target 36a or a near-vision visual target 45a is indicated, or other publicly known items can be provided as a far-vision visual target display unit or a near-vision visual target display unit.

Seventh Embodiment

Figure 10:
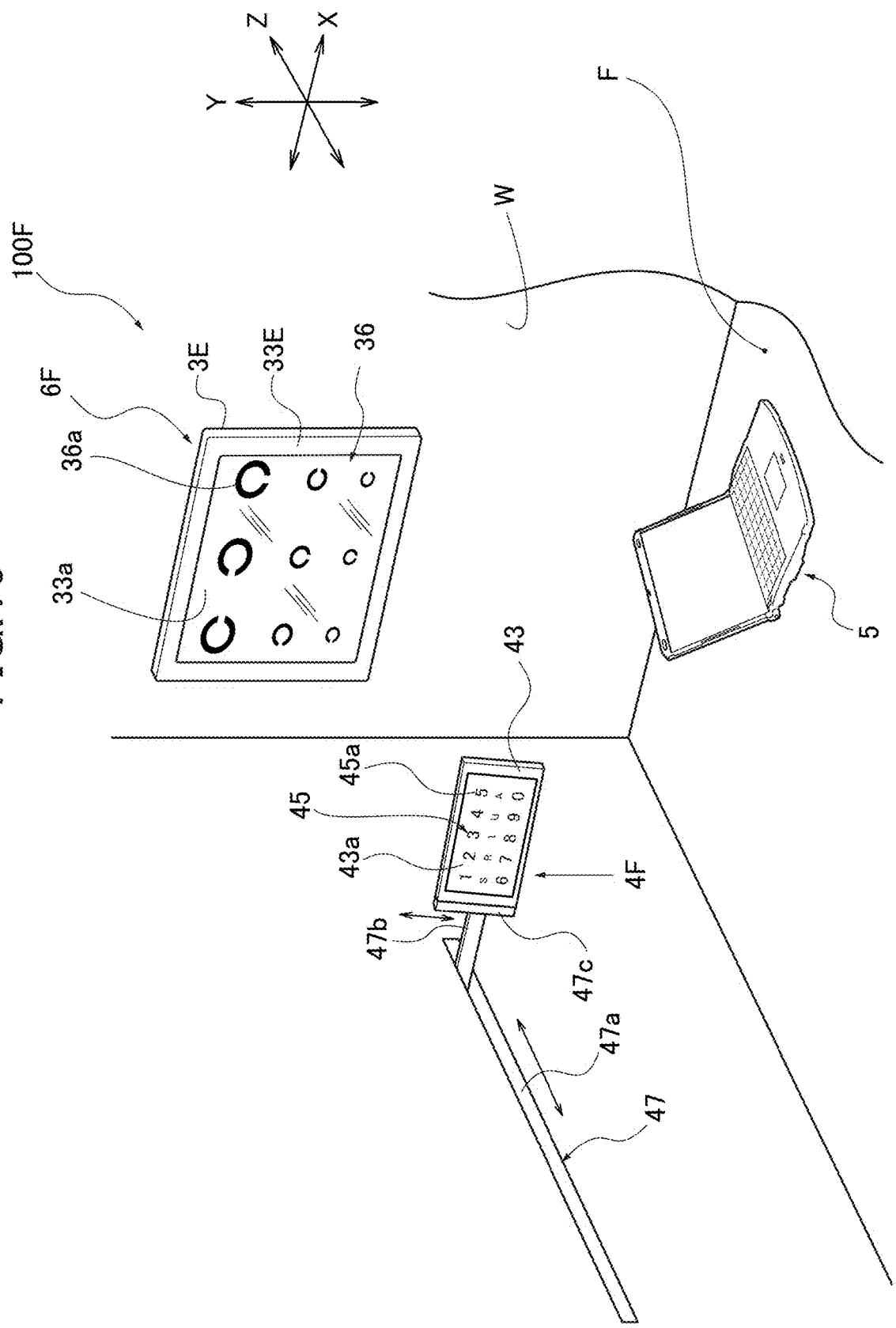
FIG. 10 is a perspective view of the external appearance of an ophthalmologic apparatus according to a seventh embodiment.

The configuration of an ophthalmologic apparatus 100F according to a seventh embodiment will be described below with reference to FIG. 10. The seventh embodiment is similar to the sixth embodiment in terms of including a far-vision visual target presenting device 3E that presents the real image of a far-vision visual target 36a to an examinee's eye E. However, the seventh embodiment is different from the sixth embodiment in terms of a near-vision visual target presenting device 4F. That is, the ophthalmologic apparatus 100F according to the seventh embodiment includes an ophthalmologic apparatus body 6F including the far-vision visual target presenting device 3E and the near-vision visual target presenting device 4F, and a controller 5.

The near-vision visual target presenting device 4F includes an adjustment mechanism 47 that makes a change in examination distance and an adjustment in level, and a second display 43 as a near-vision visual target display unit. As illustrated in FIG. 10, the adjustment mechanism 47 includes a groove 47a that is provided on a wall face W and extends in the Z direction, a movable body 47b inserted movably in the Z direction in the groove 47a, and a level adjustment mechanism 47c that is provided at the leading end of the movable body 47b and moves the second display 43 in the Y direction with respect to the movable body 47b. The second display 43 is attached to the level adjustment mechanism 47c.

The movable body 47b is moved in the Z direction in the groove 47a by a drive mechanism, not illustrated, under control of a control unit 53 or by hand. This results in movement of the second display 43 in the Z direction. Thus, the near-vision examination distance at which the second display 43 displays a near-vision eye chart 45 can be freely set or changed, enabling various types of near-vision examination.

The level adjustment mechanism 47c includes, for example, a linear-motion mechanism and a rotating mechanism that are not illustrated, and changes the position in the level direction of the second display 43 or the angle of inclination of the second display 43. Thus, in accordance with the level of the examinee's eye E, the level of the second display 43 and the angle of inclination of the second display 43 can be adjusted, so that the near-vision eye chart 45 can be properly presented to the examinee's eye E.

As described above, according to the first to seventh embodiments, provided are the first visual target presenting unit (far-vision visual target presenting device 3) that presents the first eye chart (far-vision eye chart 36) at the first examination distance (far-vision examination distance) to the examinee's eye E of which the trial lens 24 is disposed ahead and the second visual target presenting unit (near-vision visual target presenting device 4) that presents the second eye chart (near-vision eye chart) at the second examination distance (near-vision examination distance), different from the first examination distance (far-vision examination distance), to the examinee's eye E of which the trial lens 24 is disposed ahead. A visual target 36a in the first eye chart (far-vision eye chart 36) and a visual target 45a in the second eye chart (near-vision eye chart 45) are presented adjacently in the region in which no influence of aberration of the trial lens 24 is present (presentation region 7), within the range viewable by the examinee's eye E through the trial lens 24.

Due to such a configuration, in the presentation region 7 viewable through the trial lens 24 and having no influence of aberration, the first eye chart (far-vision eye chart 36) and the second eye chart (near-vision eye chart 45) can be disposed at positions different in the direction of line of sight at the time of viewing. Thus, only slight movement of the line of sight of the examinee H enables viewing with a prompt and simple switch between the first eye chart (far-vision eye chart 36) and the second eye chart (near-vision eye chart 45) through the trial lens 24, so that examination with the first examination distance (far-vision examination distance) (far-vision examination) and examination with the second examination distance (near-vision examination distance) (near-vision examination) can be continuously conducted or alternately repeated. As a result, provided can be the ophthalmologic apparatuses 100 to 100F that enable a further improvement in examination efficiency at the time of alternation of far-vision examination and near-vision examination of the examinee's eye E.

Note that the near-vision visual target presenting devices 4 to 4F according to the first to seventh embodiments can be singly productized and can be each retrofitted to an existing subjective ophthalmologic apparatus (ophthalmologic apparatus including a far-vision visual target presenting device) without any near-vision visual target presenting device. At the time of manufacture or at the time of sale, any of the near-vision visual target presenting devices 4 to 4F may be selected for addition, so that an ophthalmologic apparatus including any of the near-vision visual target presenting devices 4 to 4F can be manufactured or sold.

Then, such near-vision visual target presenting devices 4 to 4F each present the near-vision eye chart 45 at the near-vision examination distance different from the visual target presenting unit in the existing ophthalmologic apparatus and additionally present the near-vision eye chart 45 adjacently to the existing eye chart (e.g., the far-vision eye chart) in the presentation region 7 in which no influence of aberration of the trial lens 24 is present, in the region viewable by the examinee's eye E through the trial lens 24. Thus, provided can be the near-vision visual target presenting devices 4 to 4F (visual target presenting devices) that enable a further improvement in examination efficiency at the time of continuation of examination with a predetermined examination distance and examination with the second examination distance different from the examination distance (e.g., far-vision examination and near-vision examination) and an ophthalmologic apparatus including any of the near-vision visual target presenting devices 4 to 4F.

The ophthalmologic apparatuses 100 to 100F according to the above embodiments can be each used favorably for far-vision examination and near-vision examination of the examinee's eye after orthokeratology treatment with a particular contact lens, the examinee's eye after laser treatment, or the examinee's eye E in which, for example, a bifocal intraocular lens (multifocal IOL), an intraocular lens having an astigmatism correction function (premium IOL), or a Phakic intraocular lens (Phakic IOL) is put. In such cases, the crystalline lenses of examinee's eyes E after various types of treatment, contact lenses, and intraocular lenses each function as a trial lens.

The ophthalmologic apparatuses 100 to 100D according to the first to fifth embodiments each include the far-vision visual target presenting device 3 that presents the virtual image I of a visual target at the far-vision examination distance as the far-vision visual target presenting unit, and the ophthalmologic apparatuses 100E and 100F according to the sixth and seventh embodiments each include the far-vision visual target presenting device 3E that presents the real image of a visual image at the far-vision examination distance as the far-vision visual target presenting unit, but this is not limiting. The ophthalmologic apparatuses 100 to 100D according to the first to fifth embodiments may each include a far-vision visual target presenting device 3E, and the ophthalmologic apparatuses 100E and 100F according to the sixth and seventh embodiments may each include a far-vision visual target presenting device 3. Such far-vision visual target presenting units are not limiting, and thus a far-vision visual target presenting unit, made of paper, resin, metal, or wood, on which a far-vision visual target 36a is indicated, may be provided.

Eighth Embodiment

Figure 11:
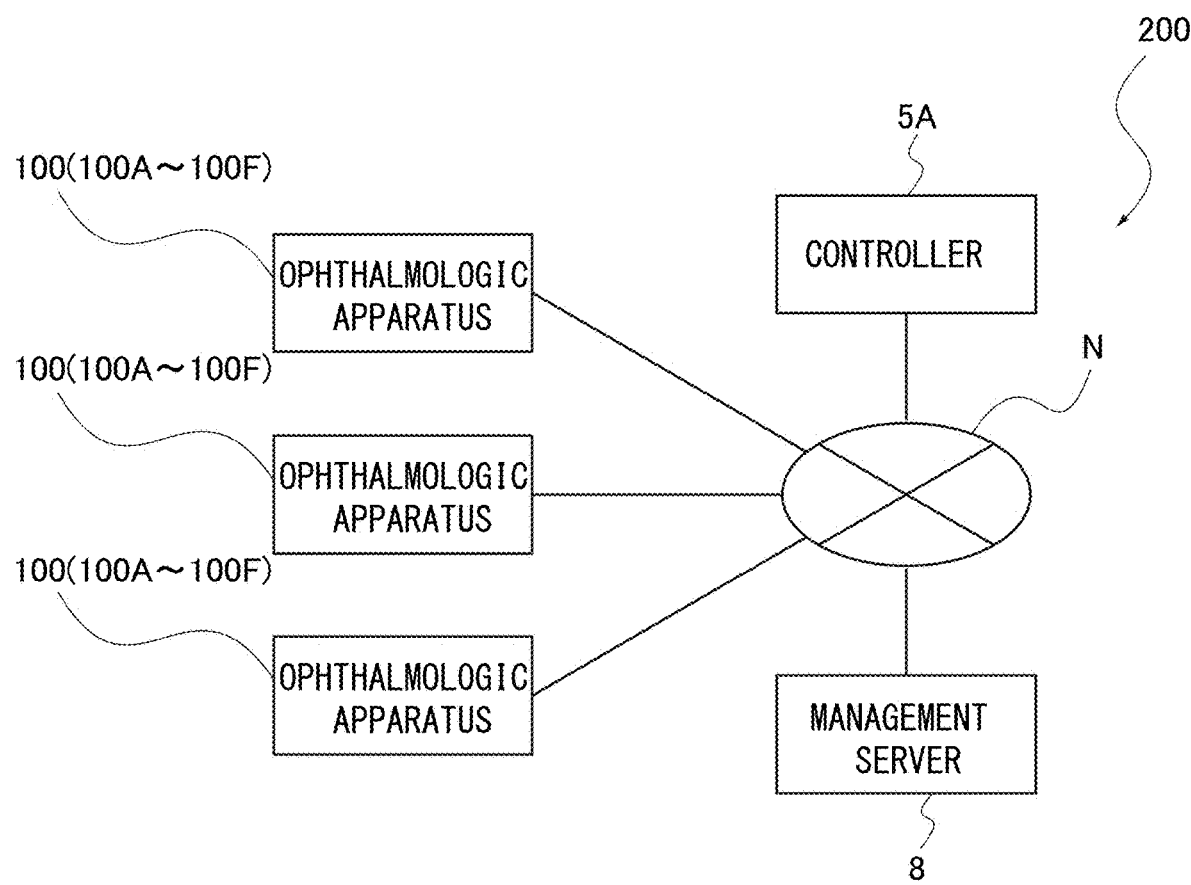
FIG. 11 is a block diagram of the configuration of an ophthalmologic system according to an eighth embodiment.

An ophthalmologic system 200 including an ophthalmologic apparatus according to an eighth embodiment will be described below with reference to FIG. 11. The ophthalmologic system 200 according to the eighth embodiment includes a single ophthalmologic apparatus or a plurality of ophthalmologic apparatuses of a single type or a plurality of ophthalmologic apparatuses of a plurality of types selected from the ophthalmologic apparatuses 100 to 100F according to the first to seventh embodiments, a controller 5A that controls the operation thereof in a centralized manner, and a management server 8.

Note that, since the controller 5A controls all the ophthalmologic apparatuses 100 to 100F collectively, the ophthalmologic apparatuses 100 to 100F each do not necessarily include the controller 5. However, the ophthalmologic apparatuses 100 to 100F may each include the controller 5. A nearby examiner may operate a controller 5 to control the corresponding ophthalmologic apparatus from the ophthalmologic apparatuses 100 to 100F or an examiner at a distant place may operate the controller 5A to control each of the ophthalmologic apparatuses 100 to 100F.

The ophthalmologic apparatus bodies 6 to 6F of the ophthalmologic apparatuses 100 to 100F (or the respective controllers 5 in a case where the ophthalmologic apparatuses 100 to 100F each include the controller 5), the controller 5A, and the management server 8 are connected communicably through a communication network N, such as the Internet. Note that the management server 8 is not necessarily provided and thus the ophthalmologic apparatuses 100 to 100F and the controller 5A may be directly connected communicably.

The ophthalmologic apparatuses 100 to 100F are installed in, for example, ophthalmologic clinics and glasses shops. The controller 5A is installed in a distant place, such as a hospital in which a medical specialist who has more advanced knowledge and skill works, an ophthalmologic-apparatus maker, or the head office of glasses shops (or may be installed in, for example, a separate room in an ophthalmologic clinic or a separate room in a glasses shop), and is operated by, for example, a medical specialist, a maker employee, or a skilled examiner. The management server 8 is achieved by, for example, a company's server or a cloud server, and receives an operation input from the controller 5A to control the operation of each of the ophthalmologic apparatuses 100 to 100F or manage, for example, measurement results.

In the ophthalmologic system 200 having such a configuration, an examiner at the distant place operates the controller 5A to display the far-vision eye chart 36 on the first display 33 or 33E or display the near-vision eye chart 45 on the second display 43. Operating the controller 5A enables change of the far-vision examination distance or the near-vision examination distance.

Then, as described in the first embodiment, close presentation of the far-vision eye chart 36 and the near-vision eye chart 45 in the presentation region 7 enables the examinee H located at a separate place from the examiner to undergo far-vision examination and near-vision examination of the examinee's eye E continuously or alternately and continuously. The examiner turns on or off the first display 33 or 33E or the second display 43 to present only the far-vision eye chart 36, only the near-vision eye chart 45, or the far-vision eye chart 36 and the near-vision eye chart 45 closely to the examinee's eye E, enabling examination with presentation of various visual targets corresponding to the purpose.

As above, according to the eighth embodiment, the examiner can perform control with the controller 5A at the distant place from, for example, the ophthalmologic apparatus 100, so that examination due to a skilled examiner or unattended examination can be conducted. Furthermore, no contact between the examiner and the examinee H enables, for example, achievement of a countermeasure against infection.

The ophthalmologic apparatuses 100 to 100F and the near-vision visual target presenting devices 4 to 4F (visual target presenting devices) according to the embodiments of the present disclosure have been described above, but the present disclosure is not limited to the embodiments in specific configuration. Thus, alterations and additions in design may be made without departing from the gist of the invention according to the scope of the claims.

What is claimed is:

1. An ophthalmologic apparatus comprising:
   a trial lens to test and correct a visual function of an eye of an examinee; and
   two visual target presenting units including:
      a first visual target presenting unit configured to present a first eye chart including a first visual target to the eye of the examinee such that the trial lens is disposed between the eye of the examinee and the first visual target, the first visual target being located at a first examination distance from the eye of the examinee; and
      a second visual target presenting unit configured to present a second eye chart including a second visual target, to the eye of the examinee such that the trial lens is disposed between the eye of the examinee and the second visual target, the second visual target being located at a second examination distance from the eye of the examinee, and the second examination distance being different from the first examination distance,
   wherein the first visual target presenting unit and the second visual target presenting unit are located at different depth positions such that the second visual target presenting unit is located closer to the eye of the examinee than is the first visual target presenting unit, and
   wherein first visual target presenting unit and the second visual target presenting unit are configured to present the first eye chart and the second eye chart simultaneously and adjacently within the same presentation region so as to be viewable by the eye of the examinee through the trial lens without adjustment of the ophthalmologic apparatus.

2. The ophthalmologic apparatus according to claim 1, wherein;
   the first visual target presenting unit is configured to present the first eye chart at any of a first group of different examination distances including the first examination distance, and/or
   the second visual target presenting unit is configured to present the second eye chart at any of a second group of different examination distances including the second examination distance.

3. The ophthalmologic apparatus according to claim 1, wherein:
   the first visual target presenting unit includes a level adjustment mechanism configured to adjust a presentation position in a level direction of the first eye chart in accordance with a position in a level direction of the eye of the examinee, and/or
   the second visual target presenting unit includes a level adjustment mechanism configured to adjust a presentation position in a level direction of the second eye chart in accordance with the position in the level direction of the eye of the examinee.

4. The ophthalmologic apparatus according to claim 1, further comprising a retreat mechanism configured to move the first eye chart and/or the second eye chart to a predetermined retreat position out of the presentation region.

5. The ophthalmologic apparatus according to claim 1, wherein;
   the first visual target presenting unit is configured to present the first eye chart such that the first visual target is displayed at a center of the first eye chart or in a predetermined display region deviating from the center of the first eye chart, and
   the second visual target presenting unit is configured to present the second eye chart close to the first visual target in a region in which the first visual target of the first eye chart is not displayed.

6. The ophthalmologic apparatus according to claim 1, further comprising:
   an examination distance changing mechanism configured to change the first examination distance and/or the second examination distance; and
   a controller configured to control the examination distance changing mechanism,
   wherein the controller and the examination distance changing mechanism are connected through any of a cable, wireless communication, and a communication network, and
   wherein the controller is configured to control, in accordance with a detail of examination, the examination distance changing mechanism to change the first examination distance and/or the second examination distance.

7. The ophthalmologic apparatus according to claim 1, further comprising a controller configured to control the first visual target presenting unit and/or the second visual target presenting unit,
   wherein the controller and the first visual target presenting unit and/or the second visual target presenting unit are connected through any of a cable, wireless communication, and a communication network, and
   the controller is configured to control, in accordance with a detail of examination, the first visual target presenting unit to change a display mode of the first visual target of the first eye chart to be presented to the eye of the examiner and/or the second visual target presenting unit to change a display mode of the second visual target of the second eye chart to be presented to the eye of the examinee.

8. The ophthalmologic apparatus according to claim 1, wherein;
   the first visual target presenting unit comprises a far-vision visual target presenting unit configured to present a far-vision first eye chart at a predetermined far-vision first examination distance, and
   the second visual target presenting unit comprises a near-vision visual target presenting unit configured to present a near-vision second eye chart at a predetermined near-vision second examination distance.

9. The ophthalmologic apparatus according to claim 8, wherein the far-vision visual target presenting unit:
   is configured such that the far-vision eye chart is disposed at the predetermined far-vision first examination distance from the eye of the examinee and a real image of the first visual target is presented, or
   includes an optical system configured to form a virtual image of the first visual target of the far-vision first eye chart at the far-vision first examination distance.

10. A visual target presenting device for use in a subjective ophthalmologic apparatus, the visual target presenting device comprising:

a first visual target presenting unit configured to present a first eye chart at a predetermined examination distance to an eye an examinee such that a trial lens is disposed between the eye of the examinee and the first eye chart, and a second visual target presenting unit configured to:
present a second eye chart at a second examination distance different from a first examination distance of first eye chart of the first visual target presenting unit of the ophthalmologic apparatus, and
simultaneously present the second eye chart adjacently to the first eye chart in a presentation region so as to be viewable by the eye of the examinee through the trial lens without adjustment of the visual target presenting device, wherein the first visual target presenting unit and the second visual target presenting unit are located at different depth positions such that the second visual target presenting unit is located closer to the eye of the examinee than is the first visual target presenting unit.

* * * * *